(12) United States Patent
Yokoyama et al.

(10) Patent No.: US 10,465,957 B2
(45) Date of Patent: Nov. 5, 2019

(54) EJECTOR-TYPE REFRIGERATION CYCLE, AND EJECTOR

(71) Applicant: DENSO CORPORATION, Kariya, Aichi-pref. (JP)

(72) Inventors: Yoshiyuki Yokoyama, Kariya (JP); Etsuhisa Yamada, Kariya (JP); Haruyuki Nishijima, Kariya (JP); Yoshiaki Takano, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 682 days.

(21) Appl. No.: 14/914,573

(22) PCT Filed: Aug. 21, 2014

(86) PCT No.: PCT/JP2014/004306
§ 371 (c)(1),
(2) Date: Feb. 25, 2016

(87) PCT Pub. No.: WO2015/029394
PCT Pub. Date: Mar. 5, 2015

(65) Prior Publication Data
US 2016/0209094 A1 Jul. 21, 2016

(30) Foreign Application Priority Data

Aug. 29, 2013 (JP) ................... 2013-177739

(51) Int. Cl.
*F25B 43/02* (2006.01)
*F25B 40/06* (2006.01)
(Continued)

(52) U.S. Cl.
CPC .............. *F25B 43/02* (2013.01); *F25B 40/06* (2013.01); *F25B 41/00* (2013.01); *F25B 41/067* (2013.01);
(Continued)

(58) Field of Classification Search
CPC ........ F25B 43/02; F25B 43/006; F25B 40/06; F25B 41/00; F25B 40/00; F25B 2341/0012
See application file for complete search history.

(56) References Cited

U.S. PATENT DOCUMENTS 2,411,347 A * 11/1946 Trumpler ................ F25B 11/00
202/177
2004/0003608 A1 * 1/2004 Takeuchi ............. B60H 1/3204
62/170
(Continued)

FOREIGN PATENT DOCUMENTS

| CN | 1475716 A | 2/2004 |
| EP | 1719650 A1 | 11/2006 |

(Continued)

OTHER PUBLICATIONS

"Machine Translation of JP 2010-133586, Jun. 2010, Shimazu et al."*
(Continued)

*Primary Examiner* — Frantz F Jules
*Assistant Examiner* — Martha Tadesse
(74) *Attorney, Agent, or Firm* — Harness, Dickey & Pierce, P.L.C.

(57) ABSTRACT

An ejector-type refrigeration cycle includes an upstream side gas-liquid separator that separates a refrigerant that has flowed out of a diffuser portion of an ejector into gas and liquid and allows the separated liquid-phase refrigerant to flow to an evaporator without storing the separated liquid-phase refrigerant, and a downstream side gas-liquid separator that separates the refrigerant flowing out of the upstream side gas-liquid separator into gas and liquid, stores the separated liquid-phase refrigerant, and allows the separated gas-phase refrigerant to flow out toward an inlet side of a compressor. The ejector-type refrigeration cycle includes a
(Continued)

refrigerant oil bypass passage for introducing a refrigerator oil within the diffuser portion into the downstream side gas-liquid separator.

3 Claims, 8 Drawing Sheets

(51) Int. Cl.
    *F25B 41/06*     (2006.01)
    *F25B 41/00*     (2006.01)
    *F25B 43/00*     (2006.01)
    *F25B 40/00*     (2006.01)
    *B60H 1/32*     (2006.01)

(52) U.S. Cl.
    CPC .... *F25B 43/006* (2013.01); *B60H 2001/3298* (2013.01); *F25B 40/00* (2013.01); *F25B 2341/0012* (2013.01); *F25B 2400/051* (2013.01)

(56) References Cited

U.S. PATENT DOCUMENTS

| | | | |
|---|---|---|---|
| 2004/0055326 A1* | 3/2004 | Ikegami | B60H 1/3214 62/500 |
| 2004/0055327 A1 | 3/2004 | Ohta et al. | |
| 2007/0163296 A1 | 7/2007 | Suzuki et al. | |
| 2009/0229305 A1* | 9/2009 | Yamada | F25B 41/00 62/500 |
| 2011/0005268 A1* | 1/2011 | Oshitani | F25B 41/00 62/500 |
| 2011/0308273 A1* | 12/2011 | Toyoshima | F25B 31/004 62/470 |
| 2015/0033790 A1 | 2/2015 | Yamada et al. | |
| 2016/0186782 A1 | 6/2016 | Nakashima et al. | |

FOREIGN PATENT DOCUMENTS

| | | | |
|---|---|---|---|
| JP | 2004108736 A | | 4/2004 |
| JP | 2006118727 A | | 5/2006 |
| JP | 2007192429 A | | 8/2007 |
| JP | 2008075926 A | | 4/2008 |
| JP | 2010133586 A | * | 6/2010 |
| JP | 2010133586 A | * | 6/2010 |
| JP | 2013177879 A | | 9/2013 |
| WO | WO-2013/114856 A1 | | 8/2013 |
| WO | WO-2015015783 A1 | | 2/2015 |

OTHER PUBLICATIONS

International Search Report and Written Opinion (in Japanese with English Translation) for PCT/JP2014/004306, dated Nov. 18, 2014; ISA/JP.

* cited by examiner

EJECTOR-TYPE REFRIGERATION CYCLE, AND EJECTOR

CROSS REFERENCE TO RELATED APPLICATIONS

This application is a U.S. National Phase Application under 35 U.S.C. 371 of International Application No. PCT/JP2014/004306 filed on Aug. 21, 2014 and published in Japanese as WO 2015/029394 A1 on Mar. 5, 2015. This application is based on and claims the benefit of priority from Japanese Patent Application No. 2013-177739 filed on Aug. 29, 2013. The entire disclosures of all of the above applications are incorporated herein by reference.

TECHNICAL FIELD

The present disclosure relates to an ejector that depressurizes a fluid, and draws the fluid due to a suction action of an ejection fluid ejected at high speed, and an ejector-type refrigeration cycle having the ejector as a refrigerant depressurizing device.

BACKGROUND ART

Up to now, an ejector-type refrigeration cycle that is a vapor compression refrigeration cycle having an ejector as a refrigerant depressurizing device has been known.

For example, Patent Document 1 discloses an ejector-type refrigeration cycle having an accumulator which is a low-pressure side gas-liquid separation device for separating a refrigerant that has flowed out of an ejector into gas and liquid, and storing an excess liquid-phase refrigerant. The ejector-type refrigeration cycle further depressurizes the liquid-phase refrigerant separated by the accumulator, causes the liquid-phase refrigerant to flow into an evaporator, and draws the gas-phase refrigerant separated by the accumulator into a compressor.

In the ejector-type refrigeration cycle of Patent Document 1, a refrigerant on a downstream side of an evaporator is drawn from a refrigerant suction port of the ejector by a suction action of a high-speed ejection refrigerant ejected from a nozzle portion of the ejector, a pressure of a mixed refrigerant of the ejection refrigerant and the suction refrigerant is increased by a pressure increase part (diffuser portion) of the ejector, and the refrigerant flows into the accumulator.

With the above configuration, in the ejector-type refrigeration cycle of Patent Document 1, a refrigerant pressure in the accumulator can be increased more than that of a refrigerant evaporation pressure in the evaporator. A consumed power of the compressor is reduced, and a coefficient of performance (COP) of the cycle can be improved in comparison with a general refrigeration cycle device in which a refrigerant evaporation pressure in the evaporator is substantially equal to a drawn refrigerant pressure in a compressor.

Incidentally, a refrigerator oil which is oil for lubricating the compressor is mixed in the refrigerant of a general vapor compression refrigeration cycle including the ejector-type refrigeration cycle, and the refrigerator oil of this type is employed with compatibility to the liquid-phase refrigerant.

For that reason, as in the ejector-type refrigeration cycle of Patent Document 1, in a configuration where the gas-phase refrigerant separated by the accumulator is drawn into the compressor, the refrigerator oil is unlikely to be supplied to the compressor, and an insufficient lubrication of the compressor occurs, and is likely to adversely affect a lifetime of the compressor. When a concentration of the refrigerator oil in the liquid-phase refrigerant separated by the accumulator increases, and the liquid-phase refrigerant high in the concentration of the refrigerator oil flows into the evaporator, the refrigerator oil stays in the evaporator, and is likely to deteriorate a heat exchanging performance of the evaporator.

Therefore, in general, in the refrigeration cycle having the accumulator, a part of the liquid-phase refrigerant separated by the accumulator, and relatively high in the concentration of the refrigerator oil is returned to the gas-phase refrigerant to be drawn to the compressor. As a result, an insufficient lubrication of the compressor is suppressed, and the amount of refrigerator oil flowing into the evaporator is reduced to restrain the refrigerator oil from staying in the evaporator.

PRIOR ART DOCUMENT

Patent Document

Patent Document 1: JP 2006-118727 A

SUMMARY OF THE INVENTION

Furthermore, in order to consider means for efficiently returning the refrigerator oil in the liquid-phase refrigerant separated by the accumulator to the gas-phase refrigerant to be drawn into the compressor, the present inventors have investigated a relationship between a concentration of the refrigerator oil in the liquid-phase refrigerant flowing into the evaporator and a cooling capacity for a fluid subjected to cooling in the evaporator, in the refrigeration cycle having the accumulator.

As a result, it has been confirmed that the amount of refrigerator oil staying in the evaporator increases to reduce the cooling capacity in the evaporator in association with an increase in the concentration of the refrigerator oil in the liquid-phase refrigerant flowing into the evaporator. In addition, it has been confirmed that when the concentration of the refrigerator oil in the liquid-phase refrigerant flowing in the evaporator is lower than a predetermined concentration, the cooling capacity in the evaporator is reduced in association with the reduction in the concentration of the refrigerator oil.

Under the circumstances, when the present inventors have investigated its reason, it has been found that grains (oil droplets) of the refrigerator oil dissolved in the refrigerant perform a function corresponding to boiling nuclei of the refrigerant, and the evaporation vaporization of the liquid-phase refrigerant in the evaporator is facilitated to enable an improvement in the cooling capacity in the evaporator in a state where the concentration of the refrigerator oil in the refrigerant flowing into the evaporator is proper.

This means that the cooling capacity of the evaporator has a maximum value (peak value) according to the concentration of the refrigerator oil. In other words, the concentration of the refrigerator oil in the liquid-phase refrigerant flowing into the evaporator is adjusted to a proper value, thereby being capable of bringing the cooling capacity of the evaporator closer to the maximum value.

The present disclosure has been made in view of the above, and an objective of the present disclosure is to provide an ejector-type refrigeration cycle which is capable of adjusting a concentration of a refrigerator oil in a liquid-phase refrigerant that flows into an evaporator.

Another objective of the present disclosure is to provide an ejector integrated with a gas-liquid separation device, which is applied to a vapor compression refrigeration cycle and is capable of adjusting a concentration of a refrigerator oil in a liquid-phase refrigerant that flows out to an external.

According to an aspect of the present disclosure, an ejector-type refrigeration cycle includes a compressor, a radiator, an ejector, an upstream side gas-liquid separation device, an evaporator, a downstream side gas-liquid separation device and a refrigerator oil concentration adjusting device. The compressor compresses and discharges a refrigerant mixed with a refrigerator oil. The radiator radiates a heat of the refrigerant discharged from the compressor. The ejector includes a nozzle portion that depressurizes the refrigerant that has flowed out of the radiator, a refrigerant suction port through which a refrigerant is drawn due to a suction action of a high-speed ejection refrigerant which is ejected from the nozzle portion, and a pressure increase part that pressurizes a mixed refrigerant of the ejection refrigerant and a suction refrigerant drawn from the refrigerant suction part. The upstream side gas-liquid separation device separates the refrigerant that has flowed out of the ejector into a liquid-phase refrigerant and a residual gas-liquid two-phase refrigerant. The upstream side gas-liquid separation device includes a liquid-phase refrigerant outlet port from which the separated liquid-phase refrigerant flows out without being stored, and a mixed-phase refrigerant outlet port from which the residual gas-liquid two-phase refrigerant flows out. The evaporator evaporates the liquid-phase refrigerant that has flowed out of the liquid-phase refrigerant outlet port, and allows the refrigerant to flow out toward the refrigerant suction port. The downstream side gas-liquid separation device separates the gas-liquid two-phase refrigerant that has flowed out of the mixed-phase refrigerant outlet port into a gas-phase refrigerant and a liquid-phase refrigerant. The downstream side gas-liquid separation device stores the separated liquid-phase refrigerant, and allows the separated gas-phase refrigerant to flow out toward an inlet side of the compressor. The refrigerator oil concentration adjusting device adjusts a concentration of the refrigerator oil in the liquid-phase refrigerant that has flowed out of the liquid-phase refrigerant outlet port.

According to the above configuration, since the refrigerator oil concentration adjusting device is provided, the concentration of the refrigerator oil in the liquid-phase refrigerant flowing into the evaporator from the liquid-phase refrigerant outlet port of the upstream side gas-liquid separation device can be adjusted to the desired concentration. Therefore, the cooling capacity for the fluid subjected to cooling in the evaporator can be brought closer to the maximum value.

In the upstream side gas-liquid separation device, the separated liquid-phase refrigerant is allowed to flow out of the liquid-phase refrigerant outlet port without being stored. Therefore, the concentration of the refrigerator oil in the liquid-phase refrigerant flowing into the evaporator is not changed by the refrigerator oil dissolved in the liquid-phase refrigerant stored in the upstream side gas-liquid separation device as in the case where the upstream side gas-liquid separation device having a reservoir function is employed.

In the downstream side gas-liquid separation device, since a function of storing the separated liquid-phase refrigerant is provided, the gas-phase refrigerant can be surely supplied to the inlet side of the compressor, and a problem on a liquid compression of the compressor can be avoided. Further, a part of the liquid-phase refrigerant in which the refrigerator oil stored in the downstream side gas-liquid separation device is dissolved is returned to the gas-phase refrigerant on the suction side of the compressor, thereby being capable of suppressing a poor lubrication of the compressor.

The cooling capacity for the fluid subjected to cooling in the evaporator can be defined as a capacity for cooling the cooling-subject fluid having a desired flow rate to a desired temperature.

Therefore, the cooling capacity is improved with a reduction in a refrigerant evaporation temperature in the evaporator, improved with an increase in the refrigeration capacity (a value obtained by subtracting an enthalpy of the inlet side refrigerant from an enthalpy of the outlet side refrigerant of the evaporator) exerted by the refrigerant in the evaporator, and improved with an increase in a refrigerant flow rate flowing into the evaporator.

Further, more specifically, the refrigerator oil concentration adjusting device may be configured by a refrigerator oil bypass passage that introduces the refrigerator oil within the pressure increase part to a downstream side of the mixed-phase refrigerant outlet port.

Additionally, a centrifugal separation type, which separates the refrigerant into gas and liquid due to an action of a centrifugal force of the refrigerant by swirling the refrigerant that has flowed into an internal part, may be adopted as the upstream side gas-liquid separation device. The refrigerator oil concentration adjusting device may be configured by a refrigerator oil bypass passage that introduces the refrigerator oil within the upstream side gas-liquid separation device toward a downstream side of the mixed-phase refrigerant outlet port.

According to another aspect of the present disclosure, an ejector is applied for a vapor compression refrigeration cycle device in which a refrigerant mixed with a refrigerator oil is circulated. The ejector includes a body including a depressurizing space in which the refrigerant is depressurized, a suction passage that communicates with a downstream side of the depressurizing space in a refrigerant flow and draws a refrigerant from an external, and a pressurizing space into which an ejection refrigerant ejected from the depressurizing space and a suction refrigerant drawn from the suction passage flow. The ejector further includes a passage formation member that is arranged at least inside the depressurizing space and the pressurizing space, and has a conical shape having a cross-sectional area that increases with distance from the depressurizing space. The depressurizing space has a nozzle passage, which functions as a nozzle depressurizing and ejecting the refrigerant, between an inner peripheral surface of the body and an outer peripheral surface of the passage formation member. The pressurizing space has a diffuser passage, which functions as a diffuser which converts a kinetic energy of a mixed refrigerant of the ejection refrigerant and the suction refrigerant into a pressure energy, between the inner peripheral surface of the body and the outer peripheral surface of the passage formation member. The body further includes: an upstream side gas-liquid separation space that separates the refrigerant that has flowed out of the diffuser passage into gas and liquid, allows the separated liquid-phase refrigerant to flow out to an external from the liquid-phase refrigerant outlet port without storing the separated liquid-phase refrigerant, and allows a residual gas-liquid two-phase refrigerant to flow out of the mixed-phase refrigerant outlet port; and a refrigerator oil bypass passage that adjusts a concentration of the refrigerator oil in the liquid-phase refrigerant flowing out of the liquid-phase refrigerant outlet port by introducing at least one of the refrigerator oil within the diffuser passage and the refrigerator oil within the upstream side gas-liquid separation space into a downstream side of the mixed-phase refrigerant outlet port.

According to the above configuration, since the refrigerator oil bypass passage is defined, the concentration of the refrigerator oil in the liquid-phase refrigerant flowing from the liquid-phase refrigerant outlet port to the external can be adjusted to a desired concentration. In other words, there can be provided the gas-liquid separation device integrated ejector capable of adjusting the concentration of the refrigerator oil in the liquid-phase refrigerant flowing to the external.

Therefore, the liquid-phase refrigerant flowing out of the liquid-phase refrigerant outlet port flows into the evaporator in applying the above configuration to the vapor compression refrigeration cycle, thereby being capable of bringing the cooling capacity for the cooling-subject fluid in the evaporator closer to the maximum value.

In the upstream side gas-liquid separation space, the separated liquid-phase refrigerant is allowed to flow out of the liquid-phase refrigerant outlet port without being stored. Therefore, the concentration of the refrigerator oil in the liquid-phase refrigerant flowing out to the external is not changed by the refrigerator oil dissolved in the liquid-phase refrigerant stored in the upstream side gas-liquid separation space as in the case where the upstream side gas-liquid separation space has the reservoir function.

In the above configuration, the passage formation member is not strictly limited to one having only the shape in which the cross-sectional area increases with distance from the depressurizing space. At least a part of the passage formation member may include a shape in which the cross-sectional area increases with distance from the depressurizing space whereby the diffuser passage can be shaped to spread outward with distance from the depressurizing space.

In addition, the "formed into a conical shape" is not limited to a meaning that the passage formation member is formed into a complete conical shape, but also includes meaning of a shape close to cone or a shape partially including the conical shape. Specifically, the cross-sectional shape taken along the axial direction is not limited to an isosceles triangle, but includes a shape in which two sides between which a vertex is sandwiched are convexed on an inner peripheral side, a shape in which the two sides between which the vertex is sandwiched are convexed on an outer peripheral side, and a shape in which the cross-sectional shape is semicircular.

EMBODIMENTS FOR EXPLOITATION OF THE INVENTION

Figure 1:
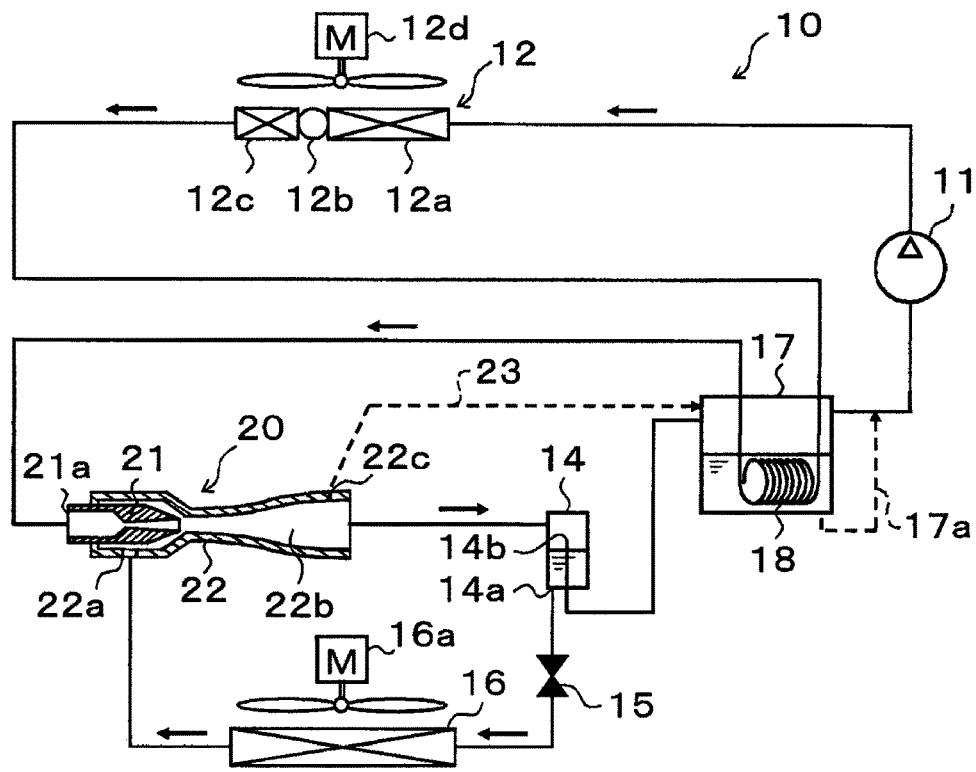
FIG. 1 is a schematic diagram of an ejector-type refrigeration cycle according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described with reference to FIGS. 1 and 2. As illustrated in an overall configuration diagram of FIG. 1, an ejector 20 according to the present embodiment is applied to a vapor compression refrigeration cycle device having an ejector as a refrigerant depressurizing device, that is, an ejector-type refrigeration cycle 10. Moreover, the ejector-type refrigeration cycle 10 is applied to a vehicle air conditioning apparatus, and performs a function of cooling a blast air which is blown into a vehicle interior that is a space to be air-conditioned.

The ejector-type refrigeration cycle 10 employs an HFC based refrigerant (specifically, R134a) as the refrigerant, and configures a subcritical refrigeration cycle in which a high pressure-side refrigerant pressure does not exceed a critical pressure of the refrigerant. The refrigeration cycle device 10 may employ an HFO based refrigerant (specifically, R1234yf) or the like as the refrigerant.

Further, the refrigerant is mixed with a refrigerator oil (oil) for lubricating a compressor 11. As the refrigerator oil, a PAG oil (polyalkylene glycol oil) having compatibility to the liquid-phase refrigerant is employed. Incidentally, the density of the refrigerator oil is smaller than the density of the liquid-phase refrigerant. In addition, a part of the refrigerator oil is circulated in the cycle together with the refrigerant.

In the ejector-type refrigeration cycle 10, the compressor 11 draws the refrigerant, pressurizes the refrigerant until the refrigerant becomes a high-pressure refrigerant, and discharges the pressurized refrigerant. More specifically, the compressor 11 according to the present embodiment is an electric compressor that is configured by accommodating a fixed-capacity-type compression mechanism and an electric motor for driving the compression mechanism in a single housing.

Any of various types of compression mechanisms, such as a scroll-type compression mechanism and a vane-type compression mechanism, can be adopted as the compression mechanism. In addition, operation (number of rotations) of the electric motor is controlled by a control signal output from a control device, which will be described below, and any type of an AC motor and a DC motor can be employed.

The compressor 11 may be configured by an engine driven compressor that is driven by a rotation driving force transmitted from a vehicle travel engine through a pulley, a belt, or the like. As the engine driven compressor of this type, a variable capacity type compressor that can adjust a refrigerant discharge capacity by a change in discharge capacity, or a fixed capacity type compressor that adjusts the refrigerant discharging capacity by changing an operation rate of the compressor through connection/disconnection of an electromagnetic clutch can be applied.

A refrigerant inlet side of a condensing portion 12a of a radiator 12 is connected to a discharge port of the compressor 11. The radiator 12 is a radiation heat exchanger which performs heat exchange between a high-pressure refrigerant discharged from the compressor 11 and a vehicle exterior air (outside air) blown by a cooling fan 12d to radiate the heat of the high-pressure refrigerant for cooling.

More specifically, the radiator 12 is a so-called subcooling condenser including: the condensing portion 12a, a receiver part 12b which is a high pressure side gas-liquid separation device, and a subcooling portion 12c. The condensing portion 12a performs heat exchange between the high pressure gas-phase refrigerant discharged from the compressor 11 and the outside air blown from the cooling fan 12d, and radiates the heat of the high pressure gas-phase refrigerant to condense the refrigerant. The receiver part 12b separates gas and liquid of the refrigerant that has flowed out of the condensing portion 12a and stores a surplus liquid-phase refrigerant. The subcooling portion 12c performs heat exchange between the liquid-phase refrigerant that has flowed out of the receiver part 12b and the outside air blown from the cooling fan 12d to subcool the liquid-phase refrigerant.

The cooling fan 12d is an electric blower of which the rotation speed (the amount of blast air) is controlled by a control voltage output from the control device.

A refrigerant outlet port of the subcooling portion 12c of the radiator 12 is connected to an inlet side of a high-pressure refrigerant passage 18. The high-pressure refrigerant passage 18 is formed of a spiral metal pipe, and disposed inside of a low-pressure liquid-phase refrigerant stored in a downstream side gas-liquid separator 17 which will be described later. Therefore, the refrigerant that has flowed out of the radiator 12 performs the heat exchange with the low-pressure liquid-phase refrigerant stored in the downstream side gas-liquid separator 17 when flowing in the high-pressure refrigerant passage 18. The high-pressure refrigerant passage 18 may be used as an example of the internal heat exchange device that performs the heat exchange between the high-pressure refrigerant flowing out of the radiator 12, and the low-pressure liquid-phase refrigerant stored in the downstream side gas-liquid separator 17.

The outlet of the high-pressure refrigerant passage 18 is connected with a refrigerant inlet port 21a of a nozzle portion 21 of the ejector 20. The ejector 20 functions as a refrigerant depressurizing device that depressurizes a high-pressure liquid-phase refrigerant of a subcooling state that has flowed out of the high-pressure refrigerant passage 18, and allows the refrigerant to flow toward a downstream side. The ejector 20 also functions as a refrigerant circulation device (refrigerant transport device) that draws (transports) and circulates the refrigerant that has flowed out of an evaporator 16 to be described later by the suction action of the refrigerant flow ejected at a high speed.

More specifically, the ejector 20 has a nozzle portion 21 and a body part 22. The nozzle portion 21 is formed of a substantially cylindrical metal (for example, stainless steel alloy) or the like that is gradually tapered toward a refrigerant flowing direction, and reduces the pressure and expands the refrigerant in an isentropic manner in a refrigerant passage (throttle passage) defined on the inside of the nozzle portion 21.

In the refrigerant passage defined in the nozzle portion 21, a throat part (minimum passage area part) whose refrigerant passage area is maximally reduced, a convergent part whose refrigerant passage area is gradually reduced from the refrigerant inlet port 21a side toward the throat part, and a divergent part whose refrigerant passage area is gradually increased from the throat part toward a refrigerant ejection port from which the refrigerant is ejected are provided. In other words, the nozzle portion 21 according to the present embodiment is configured as a Laval nozzle.

In the present embodiment, in the nozzle portion 21, a flow rate of the ejection refrigerant ejected from the refrigerant ejection port is set to be equal to or higher than a sound speed during normal operation of the ejector-type refrigeration cycle 10. It is needless to say that the nozzle portion 21 may be configured by a convergent nozzle.

The body part 22 is made of metal (for example, aluminum) or resin formed into substantially a cylindrical shape, functions as a fixing member for internally supporting and fixing the nozzle portion 21, and forms an outer shell of the ejector 20. More specifically, the nozzle portion 21 is fixed by press fitting so as to be housed in the interior of the body part 22 on one end side in the longitudinal direction of the body part 22. Therefore, the refrigerant is not leaked from a fixing portion (press-fitting part) of the nozzle portion 21 and the body part 22.

A portion of an outer peripheral side surface of the body part 22, which corresponds to an outer peripheral side of the nozzle portion 21, is provided with a refrigerant suction port 22a disposed to pass through that portion, and communicate with the refrigerant ejection port of the nozzle portion 21. The refrigerant suction port 22a is a through hole for drawing the refrigerant that has flowed out of the evaporator 16 to be described later into the interior of the ejector 20 due to the suction action of the ejection refrigerant ejected from the nozzle portion 21.

Further, a diffuser portion 22b is formed in the interior of the body part 22 as an example of a suction passage and a pressure increase part. The suction passage introduces the suction refrigerant drawn from the refrigerant suction port 22a toward the refrigerant ejection port side of the nozzle portion 21, and the pressure increase part mixes the suction refrigerant flowing into the interior of the ejector 20 from the refrigerant suction port 22a through the suction passage with the ejection refrigerant to increase the pressure of the refrigerant.

The suction passage is defined by a space between an outer peripheral side around a tip of a convergent shape of the nozzle portion 21 and an inner peripheral side of the body part 22, and a refrigerant passage area of the suction passage is gradually reduced toward the refrigerant flowing direction. With the above configuration, a flow rate of the suction refrigerant flowing in the suction passage is gradually increased, and an energy loss (mixing loss) in mixing the suction refrigerant with the ejection refrigerant is reduced by the diffuser portion 22b.

The diffuser portion 22b is disposed to be continuous to an outlet of the suction passage, and formed so that a refrigerant passage area gradually increases. With the above configuration, the diffuser portion 22b performs a function of increasing a pressure of the mixed refrigerant of the ejection refrigerant and the suction refrigerant by decreasing the flow rate of the refrigerant while the ejection refrigerant is mixed with the suction refrigerant, that is, a function of converting a velocity energy of the mixed refrigerant into a pressure energy.

More specifically, an axial cross-sectional shape of the inner peripheral wall surface of the body part 22 forming the diffuser portion 22b according to the present embodiment is defined by the combination of multiple curves. A spread degree of the refrigerant passage cross-sectional area of the diffuser portion 22b gradually increases toward the refrigerant flowing direction, and thereafter again decreases, as a result of which the refrigerant can be isentropically pressurized.

Further, the ejector 20 according to the present embodiment is connected with a refrigerator oil bypass passage 23 for introducing the refrigerator oil within the diffuser portion 22b to a refrigerant flow downstream side of a mixed-phase refrigerant outlet port 14b of an upstream side gas-liquid separator 14 to be described later. The refrigerator oil within the diffuser portion 22b includes both of a refrigerator oil dissolved in the refrigerant flowing in the diffuser portion 22b and a refrigerator oil precipitated from the refrigerant flowing in the diffuser portion 22b.

More specifically, a portion forming the diffuser portion 22b of the body part 22 in the present embodiment, which is closer to an outlet side of the diffuser portion 22b than an inlet side of the diffuser portion 22b, is provided with a small-diameter hole 22c that penetrates through the portion.

The refrigerator oil bypass passage 23 is configured by a refrigerant piping that connects the small-diameter hole 22c to the downstream side gas-liquid separator 17, and introduces the refrigerator oil flowing out of the small-diameter hole 22c or the refrigerant in which the refrigerator oil is dissolved with a high concentration into the downstream side gas-liquid separator 17. The refrigerator oil bypass passage 23 is formed by a piping having a smaller diameter than that of the other refrigerant pipings, and specifically, can be configured by a capillary tube.

A refrigerant outlet port of the diffuser portion 22b of the ejector 20 is connected with a refrigerant inlet port side of the upstream side gas-liquid separator 14 as an example of the upstream side gas-liquid separation device. The upstream side gas-liquid separator 14 is formed of a hollow cylindrical closed vessel, separates the gas-liquid of the refrigerant flowing into the interior of the upstream side gas-liquid separator 14, and allows the separated liquid-phase refrigerant to flow out of a liquid-phase refrigerant outlet port 14a without storing the separated liquid-phase refrigerant. In addition, the upstream side gas-liquid separator 14 allows the residual refrigerant that could not flow out of the liquid-phase refrigerant outlet port 14a to flow out of the mixed-phase refrigerant outlet port 14b.

More specifically, in the present embodiment, the upstream side gas-liquid separator 14 is of a centrifugal separation system that separates the refrigerant into gas and liquid due to the action of a centrifugal force generated by swirling the refrigerant flowing into an internal space of a cylindrical body part. Further, an internal volume of the body part of the upstream side gas-liquid separator 14 is set to be smaller than an excess refrigerant volume obtained by subtracting a required maximum refrigerant volume when converting the amount of refrigerant necessary for the cycle to exert the maximum capacity into a liquid phase, from a sealed refrigerant volume when converting the amount of refrigerant enclosed in the cycle into the liquid phase.

For that reason, an internal volume of the upstream side gas-liquid separator 14 according to the present embodiment has a volume insufficient to substantially accumulate the excess refrigerant even if a load variation occurs in the cycle, and the refrigerant circulation flow rate circulating in the cycle is varied. Therefore, the liquid-phase refrigerant outlet port 14a functions solely as a refrigerant outlet port from which the liquid-phase refrigerant flows out, and the mixed-phase refrigerant outlet port 14b functions as a refrigerant outlet port from which the gas-phase refrigerant or a gas-liquid two-phase refrigerant in which the gas-phase refrigerant is mixed with the liquid-phase refrigerant flows out.

Incidentally, the liquid-phase refrigerant outlet port 14a of the upstream side gas-liquid separator 14 is formed on a bottom surface of the cylindrical body part. The mixed-phase refrigerant outlet port 14b of the upstream side gas-liquid separator 14 is disposed coaxially in the body part. The mixed-phase refrigerant outlet port 14b is formed on an upper end of a cylindrical pipe member extending to protrude from a lower side of the body part toward an upper side of a liquid surface of the liquid-phase refrigerant within the body part.

The liquid-phase refrigerant outlet port 14a of the upstream side gas-liquid separator 14 is connected with a refrigerant inlet side of the evaporator 16 through a fixed throttle 15 as a depressurizing device. The fixed throttle 15 is a depressurizing device that depressurizes the liquid-phase refrigerant flowing out of the upstream side gas-liquid separator 14, and specifically can employ an orifice, a capillary tube, or a nozzle.

The evaporator 16 is a heat-absorbing heat exchanger that performs heat exchange between the low-pressure refrigerant depressurized by the fixed throttle 15 and the blast air that is blown into the vehicle interior from a blower fan 16a. As a result, the evaporator 16 evaporates the low-pressure refrigerant and performs a heat absorbing effect. The blower fan 16a is an electric blower of which a rotation speed (the amount of blast air) is controlled by a control voltage output from the control device. A refrigerant outlet port of the evaporator 16 is connected with the refrigerant suction port 22a of the ejector 20.

On the other hand, the mixed-phase refrigerant outlet port 14b side of the upstream side gas-liquid separator 14 is connected with a refrigerant inlet port side of the downstream side gas-liquid separator 17 as an example of the downstream side gas-liquid separation device (accumulator). The downstream side gas-liquid separator 17 is formed of a hollow cylindrical closed vessel, separates the refrigerant flowing into the downstream side gas-liquid separator 17 into gas and liquid, stores the separated liquid-phase refrigerant, and allows the separated gas-phase refrigerant to flow from the gas-phase refrigerant outlet port toward the inlet side of the compressor 11.

A lower side (a side where the liquid-phase refrigerant is stored) of the downstream side gas-liquid separator 17 is connected with an oil return passage 17a. The oil return passage 17a introduces a part of the stored liquid-phase refrigerant into an inlet side of the compressor 11, to thereby return the refrigerator oil dissolved in the liquid-phase refrigerant to the gas-phase refrigerant on the inlet side of the compressor 11. As with the refrigerator oil bypass passage 23, the oil return passage 17a is formed of a piping of a diameter smaller than that of the other refrigerant pipings.

Next, the control device not shown includes a well-known microcomputer including a CPU, a ROM and a RAM, and peripheral circuits of the microcomputer. The control device controls the operations of the above-mentioned various electric actuators 11, 12d, and 16a by performing various calculations and processing on the basis of a control program stored in the ROM.

An air conditioning control sensor group, such as an inside air temperature sensor for detecting a vehicle interior temperature, an outside air temperature sensor for detecting the temperature of outside air, an insolation sensor for detecting the amount of insolation in the vehicle interior, an evaporator-temperature sensor for detecting the blow-out air temperature from the evaporator 16 (the temperature of the evaporator), an outlet-side temperature sensor for detecting the temperature of a refrigerant on the outlet side of the radiator 12, and an outlet-side pressure sensor for detecting the pressure of a refrigerant on the outlet side of the radiator 12, is connected to the control device. Accordingly, detection values of the sensor group are input to the control device.

Furthermore, an operation panel not shown, which is disposed in the vicinity of a dashboard panel positioned at a front part in the vehicle interior, is connected to the input side of the control device, and operation signals output from various operation switches mounted on the operation panel are input to the control device. An air conditioning operation switch that is used to perform air conditioning in the vehicle interior, a vehicle interior temperature setting switch that is used to set the temperature of the vehicle interior, and the like are provided as the various operation switches that are mounted on the operation panel.

Meanwhile, the control device of the present embodiment is integrated with a control unit for controlling the operations of various control target devices connected to the output side of the control device, but a configuration of the control device (hardware and software), which controls the operations of the respective control target devices forms the control unit of the respective control target devices. For example, in the present embodiment, a configuration (hardware and software) for controlling the operation of the compressor 11 constitutes a discharging ability control unit.

Next, the operation of the present embodiment having the above-mentioned configuration will be described. First, when an air conditioning operation switch of the operation panel is turned on, the control device actuates the compressor 11, the cooling fan 12d, and the blower fan 16a, and so on. Accordingly, the compressor 11 draws, compresses, and discharges the refrigerant.

A high-temperature high-pressure refrigerant discharged from the compressor 11 flows into the condensing portion 12a of the radiator 12, performs heat exchange with an outside air blown from the cooling fan 12d, and is radiated and condensed. The refrigerant radiated by the condensing portion 12a is separated into gas and liquid by the receiver part 12b. A liquid-phase refrigerant, which has been subjected to gas-liquid separation in the receiver part 12b, performs heat exchange with the outside air blown from the cooling fan 12d by the subcooling portion 12c, and radiates heat into a subcooled liquid-phase refrigerant.

The subcooled liquid-phase refrigerant flowing out of the subcooling portion 12c of the radiator 12 flows into the high-pressure refrigerant passage 18, and performs the heat exchange with the liquid-phase refrigerant stored in the downstream side gas-liquid separator 17. As a result, the subcooled liquid-phase refrigerant flowing in the high-pressure refrigerant passage 18 further lowers the enthalpy. On the other hand, the liquid-phase refrigerant within the downstream side gas-liquid separator 17 absorbs the heat from the subcooled liquid-phase refrigerant flowing in the high-pressure refrigerant passage 18, increases the enthalpy, and is vaporized.

The refrigerant that has flowed out of the high-pressure refrigerant passage 18 flows into the nozzle portion 21 of the ejector 20, and is isentropically depressurized, and ejected. The refrigerant that has flowed out of the evaporator 16 is drawn from the refrigerant suction port 22a of the ejector 20 by the suction operation of the ejection refrigerant. The suction refrigerant drawn from the refrigerant suction port 22a flows into the diffuser portion 22b of the ejector 20 together with the ejection refrigerant.

In the diffuser portion 22b, the kinetic energy of the refrigerant is converted into the pressure energy by an increase of the refrigerant passage area. As a result, a pressure of the mixed refrigerant is increased while the ejection refrigerant and the suction refrigerant are mixed together. Further, in the present embodiment, the refrigerant in which the refrigerator oil is dissolved with high concentration or the refrigerator oil precipitated from the refrigerant flows into the downstream side gas-liquid separator 17 through the small-diameter hole 22c and the refrigerator oil bypass passage 23.

The refrigerant that has flowed out of an outlet part of the diffuser portion 22b flows into the upstream side gas-liquid separator 14, and is separated into gas and liquid. As described above, the upstream side gas-liquid separator 14 has no function of storing the separated liquid-phase refrigerant. Therefore, not only the separated liquid-phase refrigerant flows out of the liquid-phase refrigerant outlet port 14a, but also the residual liquid-phase refrigerant that has not flowed from the liquid-phase refrigerant outlet port 14a in the separated liquid-phase refrigerant flows out of the mixed-phase refrigerant outlet port 14b together with the separated gas-phase refrigerant.

The liquid-phase refrigerant that has flowed from the liquid-phase refrigerant outlet port 14a of the upstream side gas-liquid separator 14 is depressurized by the fixed throttle 15 in an isenthalpic manner, and flows into the evaporator 16. The refrigerant flowing into the evaporator 16 absorbs heat from the blast air blown by the blower fan 16a, and evaporates. Accordingly, the blast air blown into the vehicle interior is cooled. The refrigerant that has flowed out of the evaporator 16 is drawn from the refrigerant suction port 22a of the ejector 20.

Meanwhile, the refrigerant in which the gas-phase refrigerant and the liquid-phase refrigerant which have flowed out of the mixed-phase refrigerant outlet port 14b of the upstream side gas-liquid separator 14 are mixed together flows into the downstream side gas-liquid separator 17, and is separated into gas and liquid. The liquid-phase refrigerant separated by the downstream side gas-liquid separator 17 is stored in the downstream side gas-liquid separator 17, and the gas-phase refrigerant separated by the downstream side gas-liquid separator 17 is drawn into the compressor 11, and again compressed.

Further, in the present embodiment, a part of the liquid-phase refrigerant stored in the downstream side gas-liquid separator 17 flows into an intake side of the compressor 11 through the oil return passage 17a connected to the downstream side gas-liquid separator 17. As a result, the refrigerator oil dissolved in the liquid-phase refrigerant is returned to the gas-phase refrigerant of the intake side of the compressor 11, and drawn into the compressor 11 together with the gas-phase refrigerant.

The ejector-type refrigeration cycle 10 of the present embodiment operates as described above, and can cool the blast air to be blown into the vehicle interior. Further, in the ejector-type refrigeration cycle 10, since the refrigerant pressurized by the diffuser portion 22b is drawn into the compressor 11 through the upstream side gas-liquid separator 14 and the downstream side gas-liquid separator 17, the drive power of the compressor 11 can be reduced to improve a cycle efficiency (COP).

In the ejector-type refrigeration cycle 10 according to the present embodiment, since the refrigerator oil bypass passage 23 is provided, the refrigerator oil within the diffuser portion 22b can be easily introduced into the downstream side gas-liquid separator 17.

The above will be described in more detail. As described above, in the diffuser portion 22b, since the kinetic energy of the mixed refrigerant of the ejection refrigerant and the suction refrigerant is converted into the pressure energy, a flow rate of the mixed refrigerant flowing in the diffuser portion 22b is gradually reduced toward the refrigerant flow downstream side. In addition, in the diffuser portion 22b, a flow rate of the refrigerant in the vicinity of an inner peripheral wall surface of a portion forming the diffuser portion 22b in the body part 22 is reduced by a wall friction when the refrigerant flows.

Therefore, the flow rate of the refrigerant is largely reduced in the vicinity of an inner peripheral wall surface of a portion forming the diffuser portion 22b in the body part 22, which is closer to the outlet side than the inlet side of the diffuser portion 22b. For that reason, the liquid-phase refrigerant is liable to be adhered to the inner peripheral wall surface of the body part 22 forming the portion closer to the outlet side than the inlet side of the diffuser portion 22b.

Furthermore, since the refrigerator oil is liable to be dissolved in the liquid-phase refrigerant reduced in the flow rate and adhered to the inner peripheral wall surface, a concentration of the refrigerator oil in the liquid-phase refrigerant adhered to the inner peripheral wall surface increases. When the amount of refrigerator oil dissolved in the liquid-phase refrigerant adhered to the inner peripheral wall surface exceeds a solubility, the refrigerator oil is precipitated on the inner peripheral wall surface of the body part 22.

As a result, in the present embodiment, the refrigerator oil or the refrigerant in which the refrigerator oil is dissolved with a high concentration can be allowed to flow out of the small-diameter hole 22c defined in the body part 22. Further, the refrigerator oil or the refrigerant in which the refrigerator oil is dissolved with a high concentration can be easily introduced into the downstream side gas-liquid separator 17 through the refrigerator oil bypass passage 23.

The refrigerator oil within the diffuser portion 22b is introduced into the downstream side gas-liquid separator 17 through the small-diameter hole 22c and the refrigerator oil bypass passage 23 as described above, to thereby reduce the amount of refrigerator oil flowing out of the diffuser portion 22b and flowing into the upstream side gas-liquid separator 14.

In other words, in the present embodiment, with the provision of the small-diameter hole 22c and the refrigerator oil bypass passage 23, the amount of refrigerator oil flowing into the upstream side gas-liquid separator 14 is adjusted. Further, the concentration of the refrigerator oil in the liquid-phase refrigerant flowing out of the liquid-phase refrigerant outlet port 14a of the upstream side gas-liquid separator 14 is adjusted. Therefore, the small-diameter hole 22c and the refrigerator oil bypass passage 23 according to the present embodiment are used as an example of the refrigerator oil concentration adjusting portion.

Now, an influence of a concentration of the refrigerator oil in the liquid-phase refrigerant flowing out of the upstream side gas-liquid separator 14 and flowing into the evaporator 16 on the cooling capacity in the evaporator 16 will be described. The cooling capacity of the evaporator 16 is defined as a capacity for cooling a cooling-subject fluid having a desired flow rate (blast air in the present embodiment) to a desired temperature in the evaporator 16.

In general, when the concentration of the refrigerator oil in the liquid-phase refrigerant flowing into the evaporator 16 rises, that the refrigerator oil stays in the evaporator 16, and the heat exchanging performance of the evaporator 16 is deteriorated has been known.

Therefore, in order to consider a method of effectively returning the refrigerator oil in the liquid-phase refrigerant flowing into the evaporator 16 to the gas-phase refrigerant on the inlet side of the compressor 11, the present inventors have investigated a relationship between the concentration of the refrigerator oil in the liquid-phase refrigerant flowing into the evaporator 16 and the cooling capacity for the cooling-subject fluid in the evaporator 16.

Figure 2:
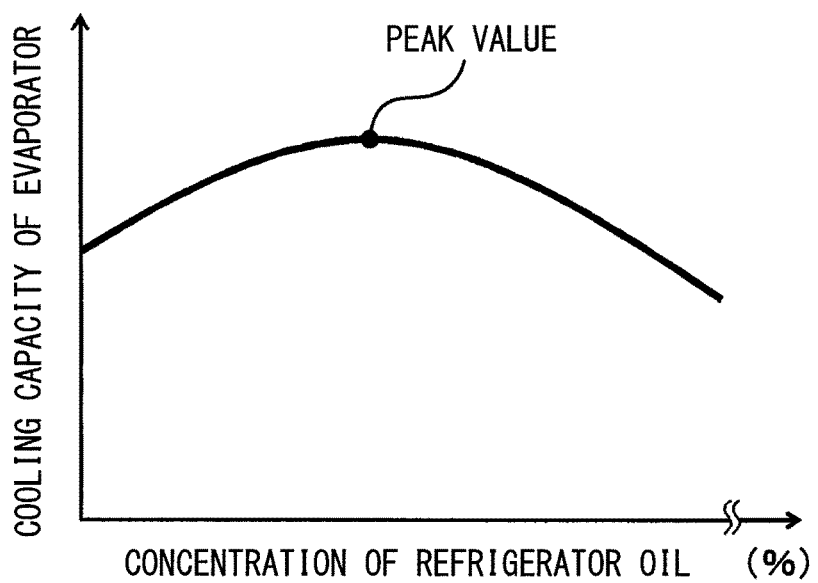
FIG. 2 is a diagram illustrating a relationship between a concentration of a refrigerator oil in a refrigerant flowing into an evaporator and a heat exchanging performance in the evaporator.

As a result, as shown in a graph of FIG. 2, it has been confirmed that the amount of refrigerator oil staying in the evaporator 16 increases to reduce the cooling capacity in the evaporator in association with an increase in the concentration of the refrigerator oil. In addition, it has been confirmed that when the concentration of the refrigerator oil is lower than a predetermined concentration, the cooling capacity in the evaporator 16 is reduced in association with the reduction in the concentration of the refrigerator oil.

Under the circumstances, when the present inventors have investigated its reason, it has been found that grains (oil droplets) of the refrigerator oil dissolved in the refrigerant perform a function corresponding to boiling nuclei of the refrigerant, and the evaporation vaporization of the liquid-phase refrigerant in the evaporator 16 is facilitated to enable an improvement in the cooling capacity in the evaporator 16 in the case where the concentration of the refrigerator oil in the refrigerant flowing into the evaporator 16 is proper.

This means that the cooling capacity of the evaporator 16 has a maximum value (peak value) according to the concentration of the refrigerator oil. In other words, the concentration of the refrigerator oil in the liquid-phase refrigerant flowing into the evaporator 16 is adjusted to a proper value, thereby being capable of bringing the cooling capacity of the evaporator 16 closer to the maximum value.

Therefore, in the present embodiment, the refrigerator oil bypass passage 23 and the small-diameter hole 22c are used as an example of the refrigerator oil concentration adjusting device for adjusting the concentration of the refrigerator oil in the liquid-phase refrigerant flowing into the evaporator 16 to a desired value. In other words, an inner diameter (refrigerant passage area) of the refrigerator oil bypass passage 23 or a diameter of the small-diameter hole 22c is set to an appropriate value with the result that the concentration of the refrigerator oil in the liquid-phase refrigerant flowing into the evaporator 16 can be adjusted to the desired value. The concentration of the refrigerator oil in the liquid-phase refrigerant flowing into the evaporator 16 is adjusted so that the cooling capacity in the evaporator 16 comes closer to a maximum value.

Further, in the upstream side gas-liquid separator 14 according to the present embodiment, since the separated liquid-phase refrigerant flows out of the liquid-phase refrigerant outlet port 14a without being stored, the concentration of the refrigerator oil in the liquid-phase refrigerant flowing into the evaporator 16 may not be changed by the refrigerator oil dissolved in the liquid-phase refrigerant stored in the upstream side gas-liquid separator 14 as in the case where the gas-liquid separator having a function of storing the separated liquid-phase refrigerant is employed as the upstream side gas-liquid separator 14.

In the downstream side gas-liquid separator 17 according to the present embodiment, since a function of storing the separated liquid-phase refrigerant is provided, the gas-phase refrigerant can be surely supplied to the inlet side of the compressor 11, and a problem on a liquid compression of the compressor 11 can be avoided. Further, a part of the liquid-phase refrigerant in which the refrigerator oil stored in the downstream side gas-liquid separator 17 is dissolved is returned to the gas-phase refrigerant on the suction side of the compressor 11 through the oil return passage 17a, thereby being capable of suppressing a poor lubrication of the compressor 11.

According to the ejector-type refrigeration cycle 10 of the present embodiment, since the high-pressure refrigerant passage 18 is provided as an example of the internal heat exchange device, the liquid-phase refrigerant within the downstream side gas-liquid separator 17 is gasified, and the concentration of the refrigerator oil in the liquid-phase refrigerant can be increased. Therefore, the refrigerant in which the refrigerator oil is dissolved with high concentration can be returned to the gas-phase refrigerant on the inlet side of the compressor 11, and a poor lubrication of the compressor 11 can be effectively suppressed.

Second Embodiment

Figure 3:
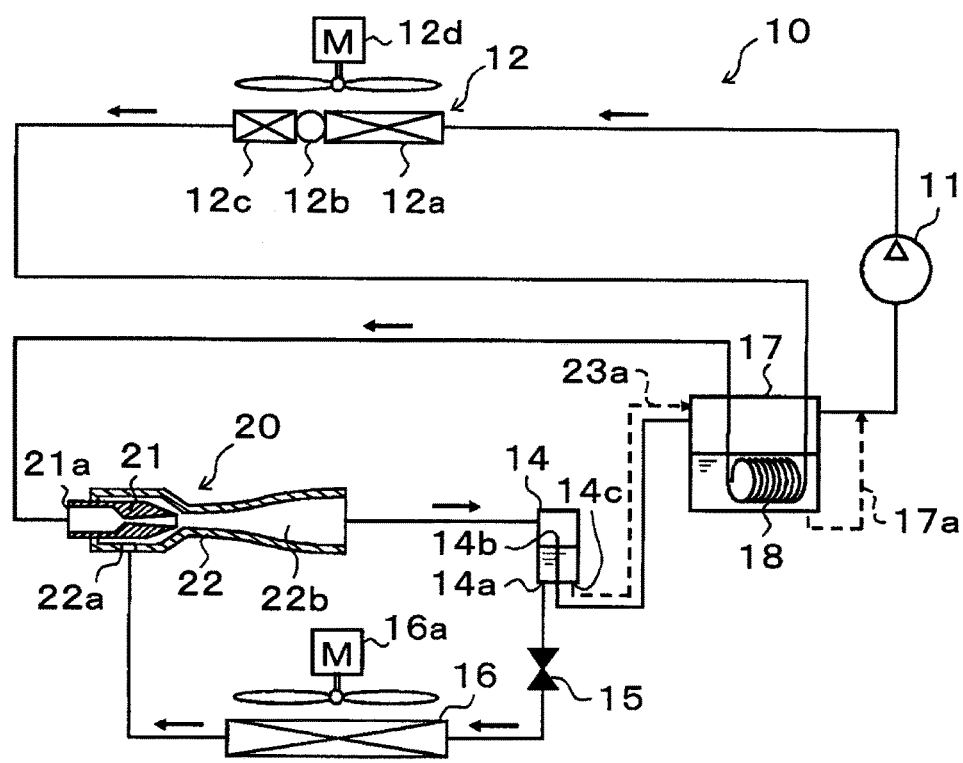
FIG. 3 is a schematic diagram of an ejector-type refrigeration cycle according to a second embodiment of the present disclosure.

In an ejector-type refrigeration cycle 10 according to the present embodiment, as illustrated in an overall configuration diagram of FIG. 3, an example in which the configuration of the refrigerator oil concentration adjusting device in the first embodiment is changed will be described. As an example of a refrigerator oil concentration adjusting device according to the present embodiment, a refrigerator oil bypass passage 23a is used. The refrigerator oil bypass passage 23a introduces a refrigerator oil in an oil return hole 14c defined in a bottom surface of a downstream side gas-liquid separator 17 and an upstream side gas-liquid separator 14 toward a refrigerant flow downstream side of a mixed-phase refrigerant outlet port 14b.

The refrigerator oil within the upstream side gas-liquid separator 14 includes both of a refrigerator oil dissolved in the refrigerant within the upstream side gas-liquid separator 14 and a refrigerator oil precipitated from the refrigerant within the upstream side gas-liquid separator 14. In FIG. 3, identical portions with or equivalent portions to those in the first embodiment are denoted by the same reference numerals. The same is applied to the following drawings.

Specifically, a refrigerator oil bypass passage 23a according to the present embodiment is configured by a refrigerant piping that connects an oil return hole 14c to a downstream side gas-liquid separator 17. The refrigerator oil bypass passage 23a introduces a refrigerator oil flowing out of the oil return hole 14c or the refrigerant in which the refrigerator oil is dissolved with a high concentration into the downstream side gas-liquid separator 17. Other structures are the same as those of the first embodiment.

Therefore, the same advantages as those in the first embodiment can be obtained when the ejector-type refrigeration cycle 10 according to the present embodiment is operated. In other words, according to the ejector-type refrigeration cycle 10 of the present embodiment, the concentration of the refrigerator oil in the liquid-phase refrigerant flowing out of the liquid-phase refrigerant outlet port 14a of the upstream side gas-liquid separator 14 can be adjusted to an appropriate concentration, and a cooling capacity in the evaporator 16 can be brought closer to a maximum value.

The above will be described in more detail. In a gas-liquid separator of a centrifugal separation system such as the upstream side gas-liquid separator 14 according to the present embodiment, a concentration of the refrigerator oil in a liquid-phase refrigerant can be distributed due to an action of a centrifugal force. For example, when the refrigerator oil of a density smaller than that of the liquid-phase refrigerant is employed as in the present embodiment, the concentration of the refrigerator oil in the liquid-phase refrigerant on a swirling center side can be set to be higher than the concentration of the refrigerator oil in the liquid-phase refrigerant on an outer peripheral side.

Therefore, with the adjustment of a position at which the oil return hole 14c is defined, and an opening shape of the oil return hole 14c, the concentration of the refrigerator oil in the liquid-phase refrigerant introduced into the downstream side gas-liquid separator 17 can be adjusted. Further, the concentration of the refrigerator oil in the liquid-phase refrigerant introduced into the downstream side gas-liquid separator 17 can be adjusted, thereby being capable of adjusting the concentration of the refrigerator oil in the liquid-phase refrigerant flowing out of the liquid-phase refrigerant outlet port 14a of the upstream side gas-liquid separator 14.

Under the circumstances, in the present embodiment, an inner diameter (refrigerant passage area) of the refrigerator oil bypass passage 23a used as an example of the refrigerator oil concentration adjusting device, or the arrangement and opening shape of the oil return hole 14c can be appropriately set, to thereby adjust the concentration of the refrigerator oil in the liquid-phase refrigerant flowing out of the liquid-phase refrigerant outlet port 14a of the upstream side gas-liquid separator 14 so that the cooling capacity of the evaporator 16 comes closer to the maximum value.

Third Embodiment

Figure 4:
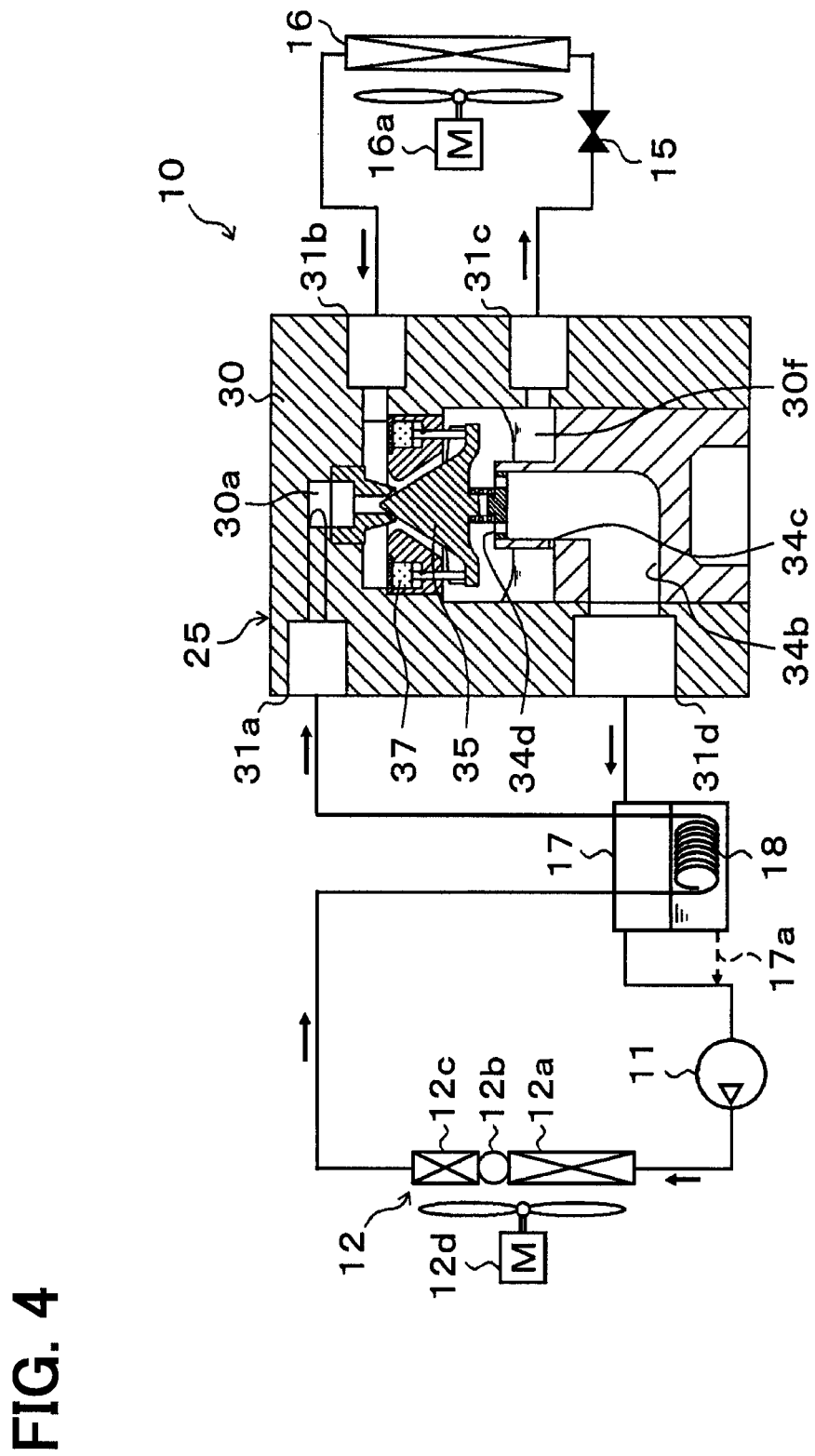
FIG. 4 is a schematic diagram of an ejector-type refrigeration cycle according to a third embodiment of the present disclosure.

In an ejector-type refrigeration cycle 10 of the present embodiment, as illustrated in an overall configuration diagram of FIG. 4, an example in which the ejector 20 and the upstream side gas-liquid separator 14 in the second embodiment are eliminated, and a gas-liquid separation device integrated ejector 25 is employed will be described.

An ejector 25 according to the present embodiment not only functions as the refrigerant depressurizing device and a refrigerant circulating device (refrigerant transport device), but also functions as a gas-liquid separation device that separates the depressurized refrigerant into gas and liquid. In other words, in the ejector 25 according to the present embodiment, the equivalent functions to those in the configuration where the ejector 20 and the upstream side gas-liquid separator 14 described in the second embodiment are integrated together can be exerted.

A specific configuration of the ejector 25 will be described with reference to FIGS. 5 and 6. Meanwhile, respective up and down arrows in FIG. 5 indicate, respectively, up and down directions in a state where the ejector-type refrigeration cycle 10 is mounted on a vehicle air conditioning apparatus. FIG. 6 is a schematic cross-sectional view illustrating a function of each refrigerant passage of the ejector 25, and portions performing the identical functions in FIG. 5 are denoted by the same reference numerals.

Figure 5:
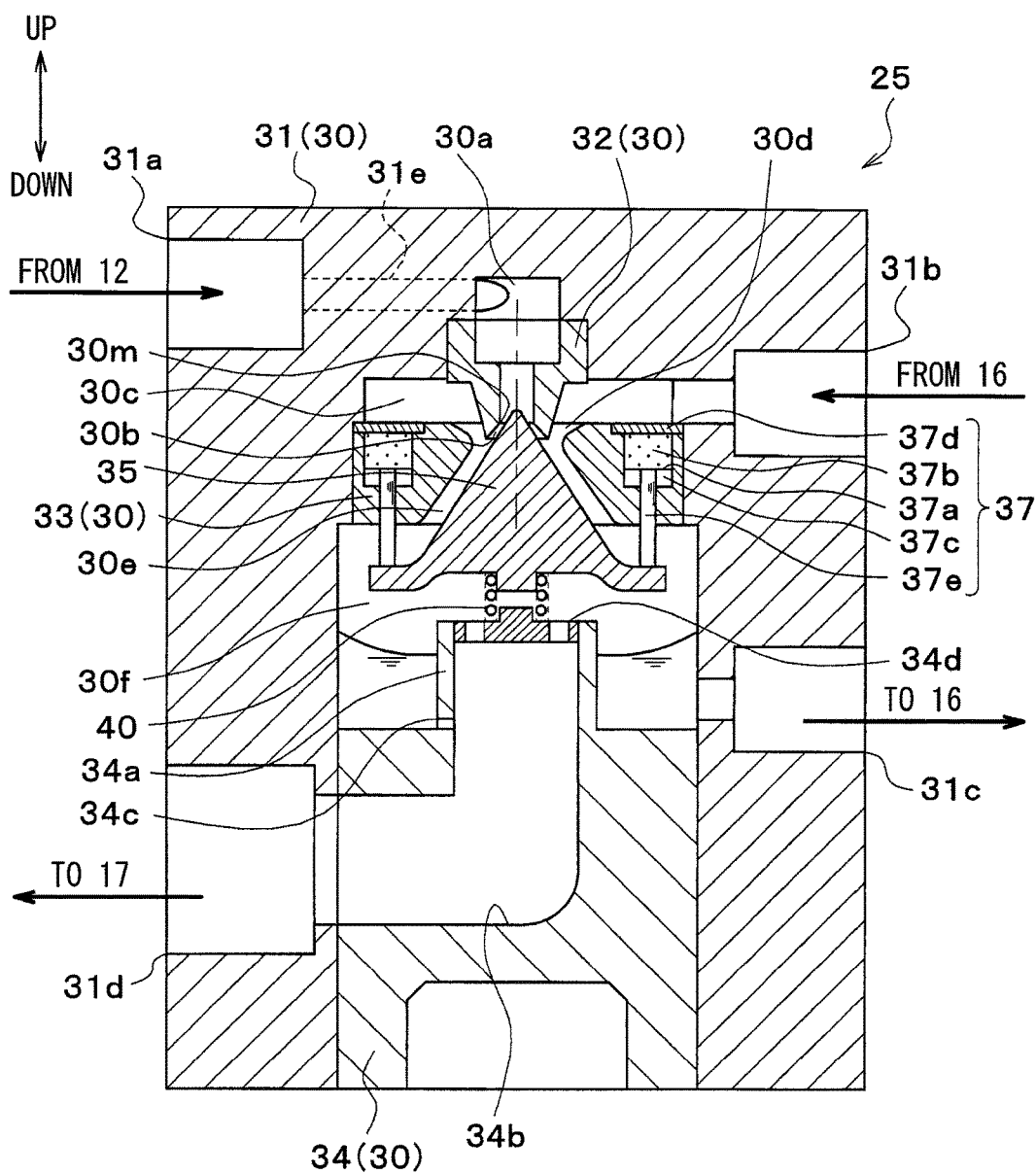
FIG. 5 is a cross-sectional view parallel to an axial direction of an ejector according to the third embodiment.
Figure 6:
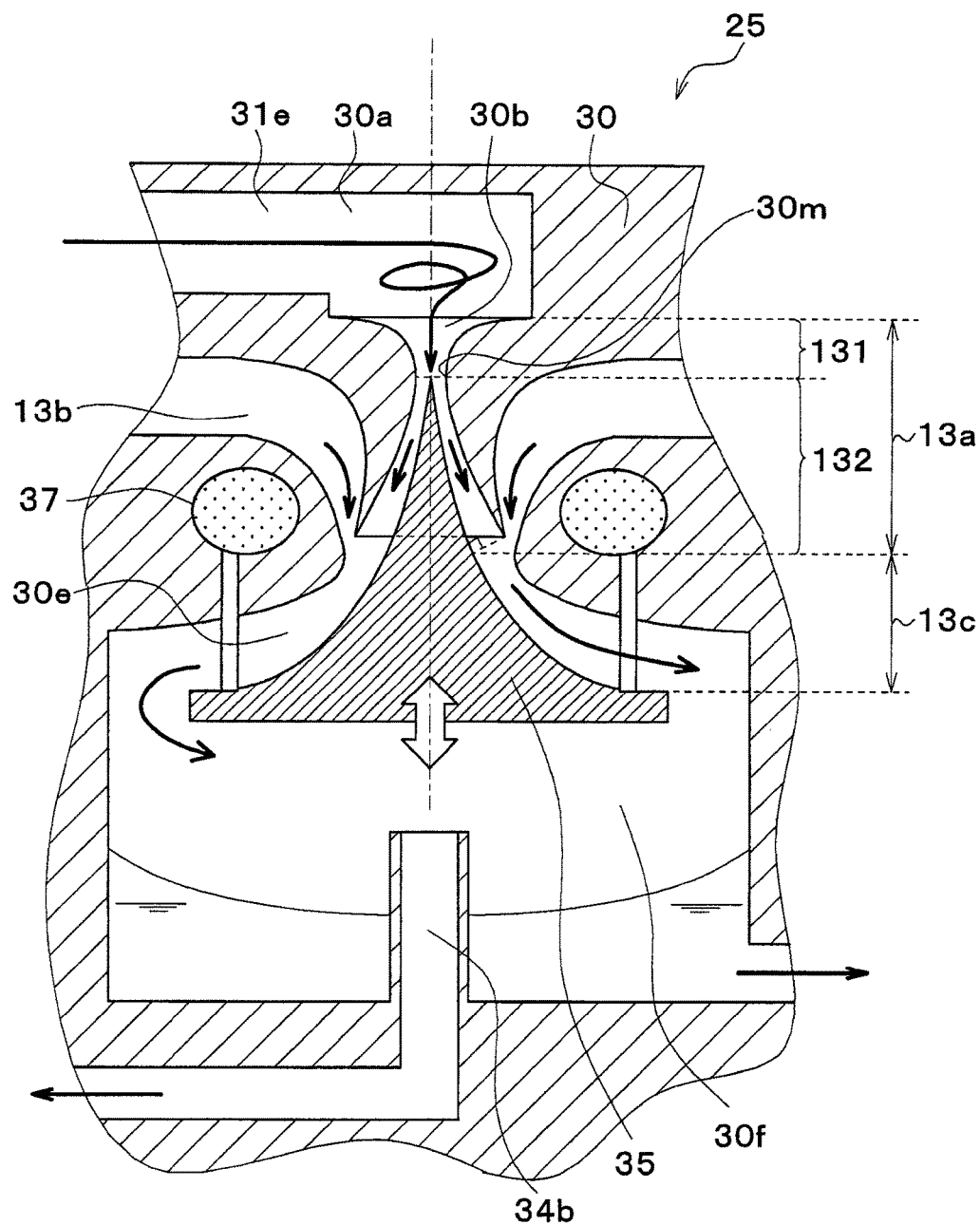
FIG. 6 is a schematic cross-sectional view illustrating a function of each refrigerant passage of the ejector according to the third embodiment.

First, as illustrated in FIG. 5, the ejector 25 of the present embodiment includes a body 30 configured by the combination of multiple components. Specifically, the body 30 has a housing body 31 made of prismatic-cylindrical or circular-cylindrical metal or resin, and forming an outer shell of the ejector 25. A nozzle body 32, a middle body 33, and a lower body 34 are fixed to an interior of the housing body 31.

The housing body 31 is formed with a refrigerant inlet port 31a through which the refrigerant that has flowed out of the radiator 12 flows into the housing body 31, and a refrigerant suction port 31b through which the refrigerant that has flowed out of the evaporator 16 is drawn. The housing body 31 is also formed with a liquid-phase refrigerant outlet port 31c through which a liquid-phase refrigerant separated by an upstream side gas-liquid separation space 30f formed within the body 30 flows out to the refrigerant inlet side of the evaporator 16, and a low-pressure refrigerant outlet port 31d through which the low-pressure refrigerant flows out to the inlet side of the downstream side gas-liquid separator 17.

The nozzle body 32 is formed of a substantially conically-shaped metal member that is tapered in a refrigerant flowing direction. The nozzle body 32 is fixed to the interior of the housing body 31 by a technique such as press fitting so that an axial direction of the nozzle body 32 is parallel to a vertical direction (up-down direction in FIG. 5). A swirling space 30a in which the refrigerant flowing from the refrigerant inlet port 31a is swirled is provided between an upper side of the nozzle body 32 and the housing body 31.

The swirling space 30a is formed into a rotating body shape, and its center axis indicated by an alternate long and short dash line in FIG. 5 extends in the vertical direction. Meanwhile, the rotating body shape is a solid shape formed by rotating a top view around one straight line (center axis) coplanar with the plane figure. More specifically, the swirling space 30a of the present embodiment is formed into a substantially cylindrical shape. The swirling space 30a may be defined in a shape in which a circular cone or a circular truncated cone is combined with a cylinder, or the like.

Further, a refrigerant inlet port passage 31e that connects the refrigerant inlet port 31a and the swirling space 30a extends in a tangential direction of an inner wall surface of the swirling space 30a when viewed in a center axis direction of the swirling space 30a. With this configuration, the refrigerant that has flowed into the swirling space 30a from the refrigerant inlet port passage 31e flows along an inner wall surface of the swirling space 30a, and swirls within the swirling space 30a.

Meanwhile, the refrigerant inlet port passage 31e does not need to be formed to completely match the tangential direction of the swirling space 30a when viewed in the center axis direction of the swirling space 30a. If the refrigerant inlet port passage 31e includes at least a component in the tangential direction of the swirling space 30a, the refrigerant inlet port passage 31e may be formed to include components in the other directions (for example, components in the axial direction of the swirling space 30a).

Since a centrifugal force acts on the refrigerant swirling in the swirling space 30a, the pressure of a refrigerant present on the center axis side becomes lower than the pressure of a refrigerant present on the outer peripheral side in the swirling space 30a. Accordingly, in the present embodiment, in a normal operation of the ejector-type refrigeration cycle 10, the refrigerant pressure on the center axis side in the swirling space 30a is reduced to a pressure at which the refrigerant is depressurized and boiled (cavitation is generated).

The adjustment of the pressure of a refrigerant present on the center axis side in the swirling space 30a can be realized by adjusting the swirling flow rate of the refrigerant swirling in the swirling space 30a. Further, the adjustment of the swirling flow rate can be conducted by, for example, adjusting an area ratio between the passage sectional area of the refrigerant inlet port passage 31e and the sectional area of the swirling space 30a perpendicular to the axial direction. Meanwhile, the swirling flow rate in the present embodiment means the flow rate of the refrigerant in the swirling direction in the vicinity of an outermost peripheral part of the swirling space 30a.

A depressurizing space 30b that allows the refrigerant that has flowed out of the swirling space 30a to be depressurized, and flow out to the downstream side is defined within the nozzle body 32. The depressurizing space 30b is defined into a rotating body shape having a cylindrical space coupled with a circular truncated conical space that gradually expands in a refrigerant flowing direction continuously from a lower side of the cylindrical space. A center axis of the depressurizing space 30b is arranged coaxially with the center axis of the swirling space 30a.

Further, a passage formation member 35 is disposed in the interior of the depressurizing space 30b. The passage formation member 35 forms a minimum passage area part 30m smallest in the refrigerant passage area within the depressurizing space 30b, and changes the passage area of the minimum passage area part 30m. The passage formation member 35 is formed in an approximately cone shape which is gradually widened toward a downstream side of a refrigerant flow, and a center axis of the passage formation member 35 is disposed coaxially with the center axis of the depressurizing space 30b. In other words, the passage formation member 35 is formed into a conical shape having a cross-sectional area increased with distance from the depressurizing space 30b.

The refrigerant passage is formed between an inner peripheral surface of a portion of the nozzle body 32 which defines the depressurizing space 30b and an outer peripheral surface of the upper side of the passage formation member 35. As illustrated in FIG. 6, the refrigerant passage includes a convergent part 131 and a divergent part 132. The convergent part 131 is formed on the upstream side of the minimum passage area part 30m in the refrigerant flow, in which the refrigerant passage area extending to the minimum passage area part 30m gradually decreases. The divergent part 132 is formed on the downstream side of the minimum passage area part 30m in the refrigerant flow, in which the refrigerant passage area gradually increases.

In the downstream side of the convergent part 131 and the divergent part 132, since the depressurizing space 30b overlaps (overlaps) with the passage formation member 35 when viewed from the radial direction, a cross-sectional shape of the refrigerant passage perpendicular to the axial direction is annular (doughnut shape obtained by removing a smaller-diameter circular shape arranged coaxially from the circular shape large in diameter).

In the present embodiment, the inner circumferential surface of the portion of the nozzle body 32 forming the depressurizing space 30b and the outer circumferential surface of the passage formation member 35 are provided so that a refrigerant passage area of the divergent part 132 is gradually widened toward the downstream side of the refrigerant flow.

In the present embodiment, the refrigerant passage defined between the inner peripheral surface of the depressurizing space 30b and the outer peripheral surface of a top side of the passage formation member 35 is configured by a nozzle passage 13a that functions in the same manner as that of the refrigerant passage defined in the nozzle portion 21 described in the first embodiment as illustrated in FIG. 6. Further, the nozzle passage 13a depressurizes the refrigerant, accelerates the flow rate of the refrigerant of a gas-liquid two-phase state to a value higher than a two-phase sonic speed, and ejects the refrigerant.

In the present embodiment, as illustrated in FIG. 6, the refrigerant passage provided between the inner peripheral surface of the depressurizing space 30b and the outer peripheral surface on the top side of the passage formation member 35 is a refrigerant passage defined in an area where a line segment extending from the outer peripheral surface of the passage formation member 35 in a normal direction crosses a portion of the nozzle body 32 in which the depressurizing space 30b is defined.

Since the refrigerant flowing into the nozzle passage 13a swirls in the swirling space 30a, the refrigerant flowing through the nozzle passage 13a, and the ejection refrigerant that is ejected from the nozzle passage 13a also have a velocity component in the same swirling direction as that of the refrigerant swirling in the swirling space 30a.

Next, the middle body 33 illustrated in FIG. 5 is formed of a disc-shaped member made of metal which defines a through hole of the rotating body shape which penetrates through both sides thereof in the center of the middle body 33. The middle body 33 accommodates a driving device 37 on an outer peripheral side of the through hole, and the driving device 37 displaces the passage formation member 35. Meanwhile, a center axis of the through hole of the middle body 33 is arranged coaxially with the center axes of the swirling space 30a and the depressurizing space 30b. The middle body 33 is fixed to the interior of the housing body 31 and the lower side of the nozzle body 32 by a technique such as press fitting.

Further, an inflow space 30c is defined between an upper surface of the middle body 33 and an inner wall surface of the housing body 31 facing the upper surface of the middle body 33, and the inflow space 30c accumulates the refrigerant that has flowed out of the refrigerant suction port 31b. Meanwhile, in the present embodiment, because a tapered tip of a lower side of the nozzle body 32 is located within the through hole of the middle body 33, the inflow space 30c is formed into an annular shape in cross-section when viewed in the center axis direction of the swirling space 30a and the depressurizing space 30b.

A suction refrigerant inflow passage connecting the refrigerant suction port 31b and the inflow space 30c extends in a tangential direction of the inner peripheral wall surface of the inflow space 30c when viewed from the center axial direction of the inflow space 30c. With the above configuration, in the present embodiment, the refrigerant flowing into the inflow space 30c from the refrigerant suction port 31b through the suction refrigerant inflow passage is swirled in the same direction as that of the refrigerant in the swirling space 30a.

The through hole of the middle body 33 has a part in which a refrigerant passage area is gradually reduced toward the refrigerant flowing direction so as to match an outer peripheral shape of the tapered tip of the nozzle body 32 in an area where the lower side of the nozzle body 32 is inserted, that is, an area in which the middle body 33 and the nozzle body 32 overlap with each other when viewed in a radial direction perpendicular to the axis line.

Accordingly, a suction passage 30d is defined between an inner peripheral surface of the through hole and an outer peripheral surface of a tapered tip of the lower side of the nozzle body 32, and the inflow space 30c communicates with a downstream side of the depressurizing space 30b in the refrigerant flow through the suction passage 30d. In other words, in the present embodiment, a suction passage 13b draws a refrigerant from the external, and is defined by the suction refrigerant inflow passage which connects the refrigerant suction port 31b and the inflow space 30c, the inflow space 30c, and the suction passage 30d.

A section perpendicular to a center axis of the suction passage 30d is also formed in an annular shape, and a refrigerant flowing through the suction passage 30d also has a velocity component of the refrigerant swirling in the same direction as the swirl direction of the refrigerant swirling in the swirling space 30a. A refrigerant outlet port (specifically, a refrigerant outlet port of the suction passage 30d) of the suction passage 13b is annularly opened on an outer peripheral side of a refrigerant outlet port (refrigerant ejection port) of the nozzle passage 13a.

A pressurizing space 30e formed into a substantially circular truncated conical shape that gradually spreads in the refrigerant flowing direction is formed in the through hole of the middle body 33 on the downstream side of the suction passage 30d in the refrigerant flow. The pressurizing space 30e is a space into which an ejection refrigerant ejected from the depressurizing space 30b (specifically, nozzle passage 13a) and a suction refrigerant drawn from the suction passage 13b flow.

A lower portion of the above-mentioned passage formation member 35 is disposed in the pressurizing space 30e. Further, a spread angle of the conical-shaped side surface of the passage formation member 35 in the pressurizing space 30e is smaller than a spread angle of the circular truncated conical space of the pressurizing space 30e. Therefore, the refrigerant passage area of the refrigerant passage is gradually enlarged toward the downstream side in the refrigerant flow.

In the present embodiment, with an increase in the refrigerant passage area as described above, as illustrated in FIG. 6, a refrigerant passage defined between the inner peripheral surface of the middle body 33 defining the pressurizing space 30e and the lower outer peripheral surface of the passage formation member 35 is configured by a diffuser passage 13c that functions in the same manner as that of the diffuser portion 22b described in the first embodiment. In the diffuser passage 13c, a kinetic energy of a mixed refrigerant of the ejection refrigerant and the suction refrigerant is converted into a pressure energy.

A cross-sectional shape of the diffuser passage 13c perpendicular to an axial direction of the diffuser passage 13c is also formed into an annular shape, and a refrigerant flowing through the diffuser passage 13c also has a velocity component of the refrigerant swirling in the same direction as the swirl direction of the refrigerant swirling in the swirling space 30a due to the velocity component in the swirl direction of the ejection refrigerant ejected from the nozzle passage 13a and the velocity component in the swirl direction of the suction refrigerant drawn from the suction passage 13b.

Next, the driving device 37 that is disposed in the interior of the middle body 33 and displaces the passage formation member 35 will be described. The driving device 37 includes a circular laminated diaphragm 37*a* which is a pressure responsive member. More specifically, as illustrated in FIG. 5, the diaphragm 37*a* is fixed by a technique such as welding so as to partition a cylindrical space defined on the outer peripheral side of the middle body 33 into two upper and lower spaces.

The upper space (the inflow space 30*c* side) of the two spaces partitioned by the diaphragm 37*a* configures a sealed space 37*b* in which a temperature sensitive medium is enclosed. A pressure of the temperature sensitive medium changes according to a temperature of the refrigerant that has flowed out of the evaporator 16. A temperature sensitive medium having the same composition as that of the refrigerant circulating through the ejector-type refrigeration cycle 10 is enclosed in the sealed space 37*b* at predetermined density. Accordingly, the temperature sensitive medium of the present embodiment is R134a.

On the other hand, the lower space of the two spaces partitioned by the diaphragm 37*a* configures an introduction space 37*c* into which the refrigerant that has flowed out of the evaporator 16 is introduced through a communication channel not shown. Therefore, the temperature of the refrigerant that has flowed out of the evaporator 16 is transmitted to the temperature sensitive medium enclosed in the sealed space 37*b* through a cap member 37*d* and the diaphragm 37*a*. The cap member 37*d* separates the inflow space 30*c* and the sealed space 37*b* from each other.

As is apparent from FIGS. 5 and 6, the suction passage 13*b* is disposed on the upper side of the middle body 33 of the present embodiment, and the diffuser passage 13*c* is disposed on the lower side of the middle body 33. Accordingly, when viewed from a radial direction of the center axis, at least a portion of the driving device 37 is disposed at a position which is vertically interposed between the suction passage 13*b* and the diffuser passage 13*c*.

In more detail, the sealed space 37*b* of the driving device 37 is arranged at a position where the suction passage 13*b* overlaps with the diffuser passage 13*c* and at a position surrounded by the suction passage 13*b* and the diffuser passage 13*c* when viewed from a center axis direction of the swirling space 30*a* and the passage formation member 35. With this configuration, the temperature of the refrigerant that has flowed out of the evaporator 16 is transmitted to the sealed space 37*b*, and an internal pressure within the sealed space 37*b* becomes a pressure corresponding to the temperature of the refrigerant that has flowed out of the evaporator 16.

Further, the diaphragm 37*a* is deformed according to a differential pressure between the internal pressure of the sealed space 37*b* and the pressure of the refrigerant which has flowed into the introduction space 37*c* out of the evaporator 16. For that reason, it is preferable that the diaphragm 37*a* is made of a material rich in elasticity, excellent in heat conduction, and tough. For example, it is desirable that the diaphragm 37*a* is formed of a metal laminate made of stainless steel (SUS304).

An upper end side of a cylindrical actuating bar 37*e* is joined to a center part of the diaphragm 37*a* by a technique such as welding, and a lower end side of the actuating bar 37*e* is fixed to an outer peripheral and lowermost side (bottom) of the passage formation member 35. With this configuration, the diaphragm 37*a* and the passage formation member 35 are coupled with each other, and the passage formation member 35 is displaced in accordance with a displacement of the diaphragm 37*a* to adjust the refrigerant passage area of the nozzle passage 13*a* (passage cross-sectional area in the minimum passage area part 30*m*).

Specifically, when the temperature (the degree of superheat) of the refrigerant flowing out of the evaporator 16 rises, a saturated pressure of the temperature sensitive medium enclosed in the sealed space 37*b* rises to increase a differential pressure obtained by subtracting the pressure of the introduction space 37*c* from the internal pressure of the sealed space 37*b*. Accordingly, the diaphragm 37*a* displaces the passage formation member 35 in a direction of increasing the passage cross-sectional area in the minimum passage area part 30*m* (downward in the vertical direction).

On the other hand, when the temperature (the degree of superheat) of the refrigerant flowing out of the evaporator 16 falls, the saturated pressure of the temperature sensitive medium enclosed in the sealed space 37*b* falls to decrease the differential pressure obtained by subtracting the pressure of the introduction space 37*c* from the internal pressure of the sealed space 37*b*. With the above configuration, the diaphragm 37*a* displaces the passage formation member 35 in a direction of reducing the passage cross-sectional area of the minimum passage area part 30*m* (toward the upper side in the vertical direction).

The diaphragm 37*a* displaces the passage formation member 35 vertically according to the degree of superheat of the refrigerant that has flowed out of the evaporator 16 as described above. As a result, the passage cross-sectional area of the minimum passage area part 30*m* can be adjusted so that the degree of superheat of the refrigerant that has flowed out of the evaporator 16 comes closer to a predetermined value. A gap between the actuating bar 37*e* and the middle body 33 is sealed by a seal member such as an O-ring not shown, and the refrigerant is not leaked through the gap even if the actuating bar 37*e* is displaced.

The bottom of the passage formation member 35 is subjected to a load of a coil spring 40 fixed to the lower body 34. The coil spring 40 urges the load against the passage formation member 35 so as to reduce the passage cross-sectional area in the minimum passage area part 30*m* (upper side in FIG. 5). With the regulation of this load, a valve opening pressure of the passage formation member 35 can be changed to change a target degree of superheat.

Further, in the present embodiment, the multiple (specifically, two) cylindrical spaces are defined on the outer peripheral side of the part of the middle body 33, and the respective circular laminated diaphragms 37*a* are fixed in those spaces to configure two driving devices 37. However, the number of driving devices 37 is not limited to this number. When the driving devices 37 are provided at plural locations, it is desirable that the driving devices 37 are arranged at regular angular intervals with respect to the respective center axes.

Alternatively, a diaphragm formed of the annular thin plate may be fixed in a space having an annular shape when viewed from the axial direction, and the diaphragm and the passage formation member 35 may be coupled with each other by multiple actuating bars.

Next, the lower body 34 is formed of a circular-cylindrical metal member, and fixed by a technique such as press fitting or screwing so as to close a bottom surface side of the housing body 31. In the internal space of the housing body 31, the upstream side gas-liquid separation space 30*f* that separates gas and liquid of the refrigerant that has flowed out of the diffuser passage 13*c* from each other is provided between the upper surface side of the lower body 34 and the bottom surface side of the middle body 33.

The upstream side gas-liquid separation space 30f is defined as a space of a substantially cylindrical rotating body shape, and the center axis of the upstream side gas-liquid separation space 30f is also arranged coaxially with the center axes of the swirling space 30a, the depressurizing space 30b, and the passage formation member 35.

The refrigerant, which flows out of the diffuser passage 13c into the upstream side gas-liquid separation space 30f, has the velocity component of the refrigerant swirling in the same direction as the swirl direction of the refrigerant swirling in the swirling space 30a. Therefore, as with the upstream side gas-liquid separator 14 described in the first embodiment, the upstream side gas-liquid separation space 30f functions as the gas-liquid separation device of the centrifugal separation system which separates the refrigerant into the gas and the liquid due to the action of the centrifugal force.

An internal volume of the upstream side gas-liquid separation space 30f has the same internal volume as that of the upstream side gas-liquid separator 14 described in the first embodiment. Therefore, in the upstream side gas-liquid separation space 30f, the separated liquid-phase refrigerant is allowed to flow out of the liquid-phase refrigerant outlet port 31c without being stored, and the residual refrigerant that could not flow out of the liquid-phase refrigerant outlet port 31c is allowed to flow out of a mixed-phase refrigerant outlet port 34d.

The mixed-phase refrigerant outlet port 34d is defined in an upper end of the cylindrical pipe part 34a provided in the center of the lower body 34. The pipe part 34a is disposed coaxially with the upstream side gas-liquid separation space 30f, and extends upward. Therefore, the liquid-phase refrigerant separated by the upstream side gas-liquid separation space 30f temporarily stays on the outer peripheral side of the pipe part 34a, and flows out of the liquid-phase refrigerant outlet port 31c.

A mixed-phase refrigerant outlet port passage 34b is defined in the interior of the pipe part 34a. The mixed-phase refrigerant outlet port passage 34b introduces the gas-phase refrigerant that has flowed into the mixed-phase refrigerant outlet port 34d or the refrigerant in which the gas-phase refrigerant is mixed with the liquid-phase refrigerant into the low-pressure refrigerant outlet port 31d. Further, the above-mentioned coil spring 40 is fixed to an upper end of the pipe part 34a. The coil spring 40 also functions as a vibration absorbing member that attenuates the vibration of the passage formation member 35, which is caused by a pressure pulsation generated when the refrigerant is depressurized.

A refrigerator oil bypass passage 34c is defined in a root part (lowermost part) of the pipe part 34a. The refrigerator oil bypass passage 34c introduces the refrigerator oil within the upstream side gas-liquid separation space 30f into the mixed-phase refrigerant outlet port passage 34b on the refrigerant flow downstream side of the mixed-phase refrigerant outlet port 34d to adjust the concentration of the refrigerator oil in the liquid-phase refrigerant flowing out of the liquid-phase refrigerant outlet port 31c.

As in the second embodiment, the refrigerator oil within the upstream side gas-liquid separation space 30f includes both of the refrigerator oil dissolved in the refrigerant within the upstream side gas-liquid separation space 30f and the refrigerator oil precipitated from the refrigerant within the upstream side gas-liquid separation space 30f. The other configuration is identical with that in the second embodiment.

As described above, since the ejector 25 according to the present embodiment exerts the same function as that in the configuration where the ejector 20 and the upstream side gas-liquid separator 14 are integrated together as described in the second embodiment, when the ejector-type refrigeration cycle 10 according to the present embodiment is operated, the same advantages as those in the second embodiment can be obtained.

In other words, according to the ejector 25 of the present embodiment, as in the second embodiment, an inner diameter (refrigerant passage area) of the refrigerator oil bypass passage 34c or the arrangement and the opening shape of the refrigerator oil bypass passage 34c are appropriately set so that the concentration of the refrigerator oil in the liquid-phase refrigerant flowing out of the liquid-phase refrigerant outlet port 31c can be adjusted to an appropriate concentration. The cooling capacity of the evaporator 16 can be brought closer to a maximum value.

Further, according to the ejector 25 of the present embodiment, the refrigerant is swirled in the swirling space 30a with the results that a refrigerant pressure on a swirling center side in the swirling space 30a can be reduced to a pressure of a saturated liquid-phase refrigerant, or a pressure at which the refrigerant is depressurized and boiled (cavitation occurs). With the above operation, a larger amount of gas-phase refrigerant is present on an inner peripheral side than an outer peripheral side of a swirling center axis. This leads to a two-phase separation state in which the refrigerant has a gas single phase in the vicinity of a swirling center line within the swirling space 30a, and has a liquid single phase around the vicinity thereof.

The refrigerant that has become in the two-phase separation state as described above flows into the nozzle passage 13a. As a result, in the convergent part 131 of the nozzle passage 13a, boiling of the refrigerant is promoted by the wall surface boiling generated when the refrigerant is separated from the outer peripheral side wall of the annular refrigerant passage, and the interface boiling caused by a boiling nuclear generated by the cavitation of the refrigerant on the center axis side of the annular refrigerant passage. Accordingly, the refrigerant that flows into the minimum passage area part 30m of the nozzle passage 13a is brought closer to a gas-liquid mixed state in which the gas phase and the liquid phase are homogeneously mixed together.

The flow of the refrigerant in the gas-liquid mixed state is blocked (choked) in the vicinity of the minimum passage area part 30m. The refrigerant in the gas-liquid mixed state which reaches the sonic speed by the choking is accelerated in the divergent part 132, and ejected. As described above, the refrigerant of the gas-liquid mixed state can be efficiently accelerated to the sonic speed by the boiling promotion caused by both of the wall surface boiling and the interface boiling. As a result, the energy conversion efficiency (corresponding to the nozzle efficiency) in the nozzle passage 13a can be improved.

The upstream side gas-liquid separation space 30f that separates gas and liquid of the refrigerant that has flowed out of the diffuser passage 13c from each other is formed in the body 30 of the ejector 25 of the present embodiment. Hence, the capacity of the upstream side gas-liquid separation space 30f can be effectively reduced as compared with a case in which a gas-liquid separation device is provided separately from the ejector 25.

In other words, in the upstream side gas-liquid separation space 30f of the present embodiment, since the refrigerant that flows out of the diffuser passage 13c formed in an annular section has velocity components in the swirl direction in advance, there is no need to provide a space for generating the swirl flow of the refrigerant in the upstream side gas-liquid separation space 30*f*. Therefore, the capacity of the upstream side gas-liquid separation space 30*f* can be effectively reduced as compared with the case in which the gas-liquid separating device is provided apart from the ejector 25.

Fourth Embodiment

Figure 7:
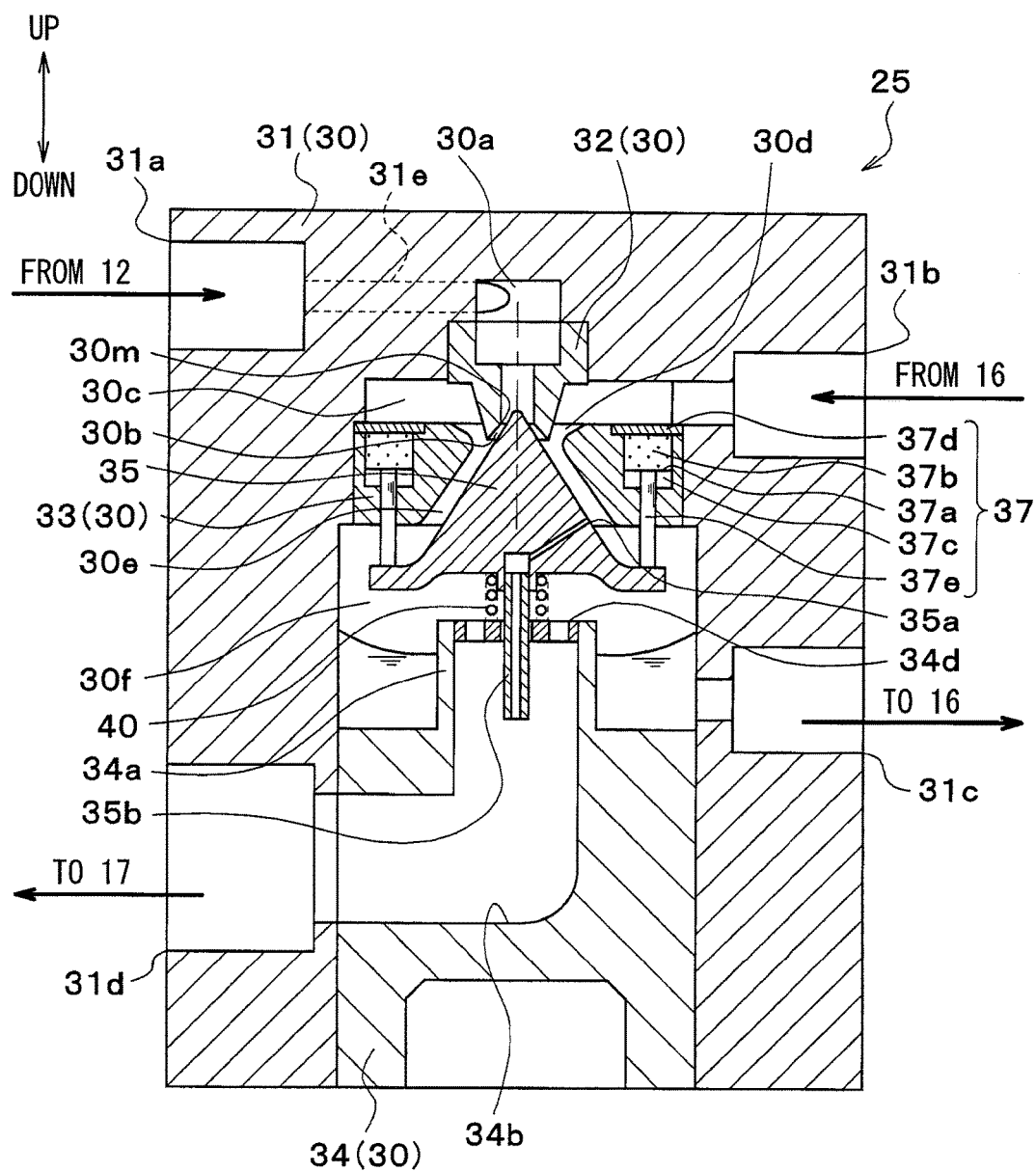
FIG. 7 is a cross-sectional view parallel to an axial direction of an ejector according to a fourth embodiment of the present disclosure.

In the present embodiment, as illustrated in FIG. 7, an example in which the configuration of the ejector 25 in the third embodiment is changed will be described. Specifically, in an ejector 25 according to the present embodiment, a refrigerator oil bypass passage 35*b* is connected to a center of a bottom surface of a passage formation member 35.

The refrigerator oil bypass passage 35*b* according to the present embodiment is formed of a pipe member that introduces the refrigerator oil within a diffuser passage 13*c* into a refrigerant flow downstream side of a mixed-phase refrigerant outlet port 34*d*, and extends from a bottom surface of the passage formation member 35 into a mixed-phase refrigerant outlet port passage 34*b*. Therefore, the refrigerator oil bypass passage 35*b* is displaced together with the passage formation member 35.

The refrigerator oil within the diffuser passage 13*c* includes both of a refrigerator oil dissolved in the refrigerant flowing in the diffuser passage 13*c* and a refrigerator oil precipitated from the refrigerant flowing in the diffuser passage 13*c*.

A small-diameter hole 35*a* is defined in the passage formation member 35 of the present embodiment. The refrigerator oil in the diffuser passage 13*c* flows out of the small-diameter hole 35*a*. More specifically, an inlet of the small-diameter hole 35*a* is a portion forming the diffuser passage 13*c* in the passage formation member 35, and defined in a portion closer to an outlet than an inlet of the diffuser passage 13*c*, and an outlet of the small-diameter hole 35*a* is opened in the center of a bottom surface of the passage formation member 35.

With the above configuration, in the refrigerator oil bypass passage 35*b* according to the present embodiment, the refrigerator oil flowing out of the small-diameter hole 35*a* or the refrigerant in which the refrigerator oil is dissolved with high concentration is introduced into the mixed-phase refrigerant outlet port passage 34*b* on the refrigerant flow downstream side of the mixed-phase refrigerant outlet port 34*d*. The other configurations are identical with those in the third embodiment.

Therefore, the same advantages as those in the first embodiment can be obtained when the ejector-type refrigeration cycle 10 according to the present embodiment is operated.

In other words, according to the ejector 25 of the present embodiment, as in the first embodiment, an inner diameter (refrigerant passage area) of the refrigerator oil bypass passage 35*b* or a diameter of the small-diameter hole 35*a* is appropriately set so that the concentration of the refrigerator oil in the liquid-phase refrigerant flowing out of the liquid-phase refrigerant outlet port 31*c* can be adjusted to an appropriate concentration. The cooling capacity of the evaporator 16 is adjusted to come closer to a maximum value.

Further, according to the ejector 25 of the present embodiment, as in the third embodiment, an energy conversion efficiency (corresponding to a nozzle efficiency) in the nozzle passage 13*a* can be improved, and a capacity of the upstream side gas-liquid separation space 30*f* can be effectively reduced.

Fifth Embodiment

Figure 8:
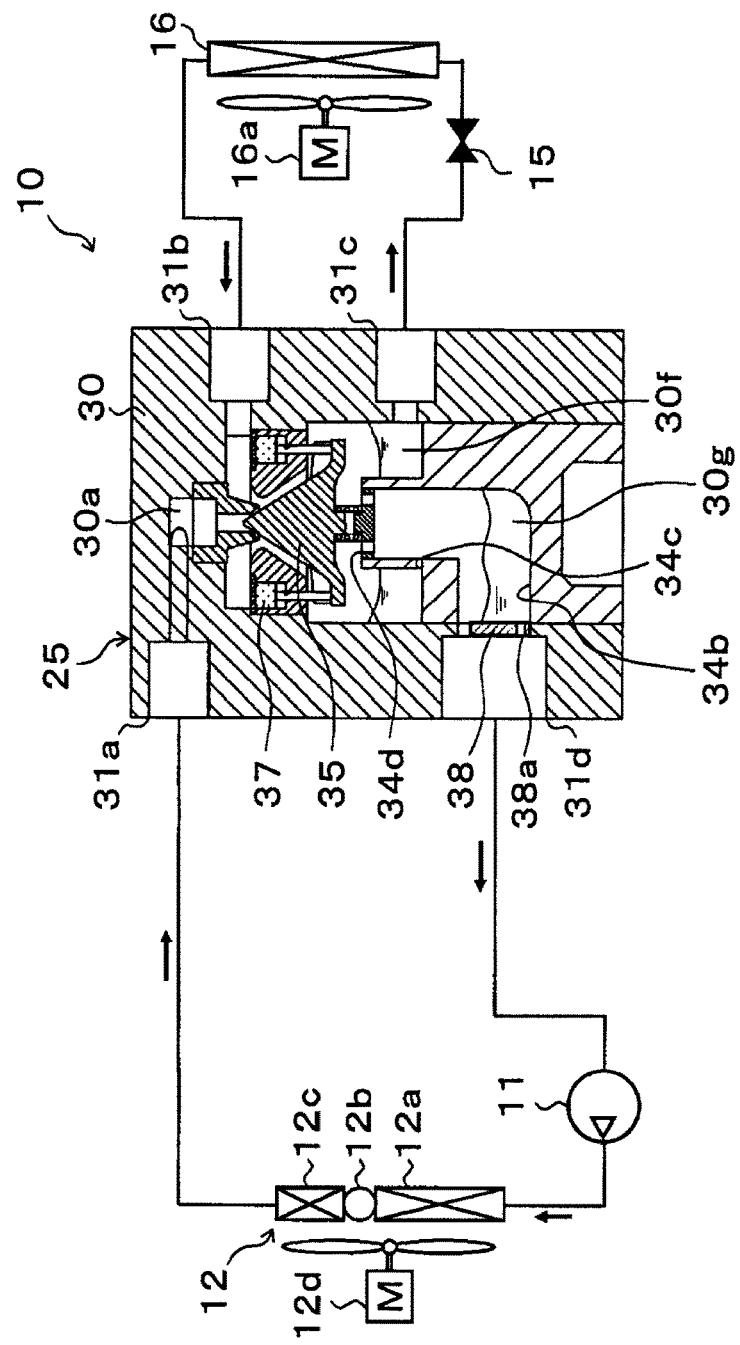
FIG. 8 is a schematic diagram of an ejector-type refrigeration cycle according to a fifth embodiment of the present disclosure.

In an ejector-type refrigeration cycle 10 according to the present embodiment, as illustrated in an overall configuration diagram of FIG. 8, an example in which the high-pressure refrigerant passage 18 and the downstream side gas-liquid separator 17 are eliminated, and the configuration of the ejector 25 is changed in the third embodiment will be described.

Specifically, in an ejector 25 of the present embodiment, a partition plate 38 is disposed in the interior of a mixed-phase refrigerant outlet port passage 34*b*, and a downstream side gas-liquid separation space 30*g* is defined in the interior of the ejector 25. The downstream side gas-liquid separation space 30*g* separates the refrigerant in which a gas-phase refrigerant and a liquid-phase refrigerant which flow out of a mixed-phase refrigerant outlet port 34*d* are mixed together into gas and liquid, and stores the separated liquid-phase refrigerant.

The partition plate 38 is formed of a plate member extending from a lower side toward an upper side, and a gravity-driven gas-liquid separation device is disposed in the downstream side gas-liquid separation space 30*g*. The gas-liquid separation device allows the refrigerant flowing in the downstream side gas-liquid separation space 30*g* to collide with the partition plate 38, and allows the liquid-phase refrigerant high in density to drop to a lower side, thereby separating the refrigerant into gas and liquid. Therefore, the downstream side gas-liquid separation space 30*g* according to the present embodiment has the same function as that of the downstream side gas-liquid separator 17 described in the first embodiment.

Further, a gas-phase refrigerant discharge passage is defined on an upper side of the partition plate 38. The gas-phase refrigerant discharge passage allows the gas-phase refrigerant separated by the downstream side gas-liquid separation space 30*g* to flow out to the low-pressure refrigerant outlet port 31*d* side. In addition, an oil return hole 38*a* is defined on a lower side of the partition plate 38. The oil return hole 38*a* penetrates through the partition plate 38, and returns the refrigerator oil dissolved in the liquid-phase refrigerant stored in the downstream side gas-liquid separation space 30*g* to the gas-phase refrigerant on the inlet side of the compressor 11.

Therefore, when the ejector-type refrigeration cycle 10 according to the present embodiment is operated, an effect of increasing a concentration of the refrigerator oil in the liquid-phase refrigerant within the downstream side gas-liquid separation space 30*g* by the provision of an internal heat exchange device is not obtained, but the same advantages as those in the first embodiment can be obtained.

In other words, according to the ejector 25 of the present embodiment, as in the third embodiment, the concentration of the refrigerator oil in the liquid-phase refrigerant flowing out of the liquid-phase refrigerant outlet port 31*c* can be adjusted to an appropriate concentration, and a cooling capacity in the evaporator 16 can be brought closer to a maximum value.

Further, in the present embodiment, since the downstream side gas-liquid separator 17 described in the first embodiment is eliminated, and the downstream side gas-liquid separation space 30g is defined in the interior of the ejector 25, the ejector-type refrigeration cycle 10 can be reduced in size as a while.

Sixth Embodiment

Figure 9:
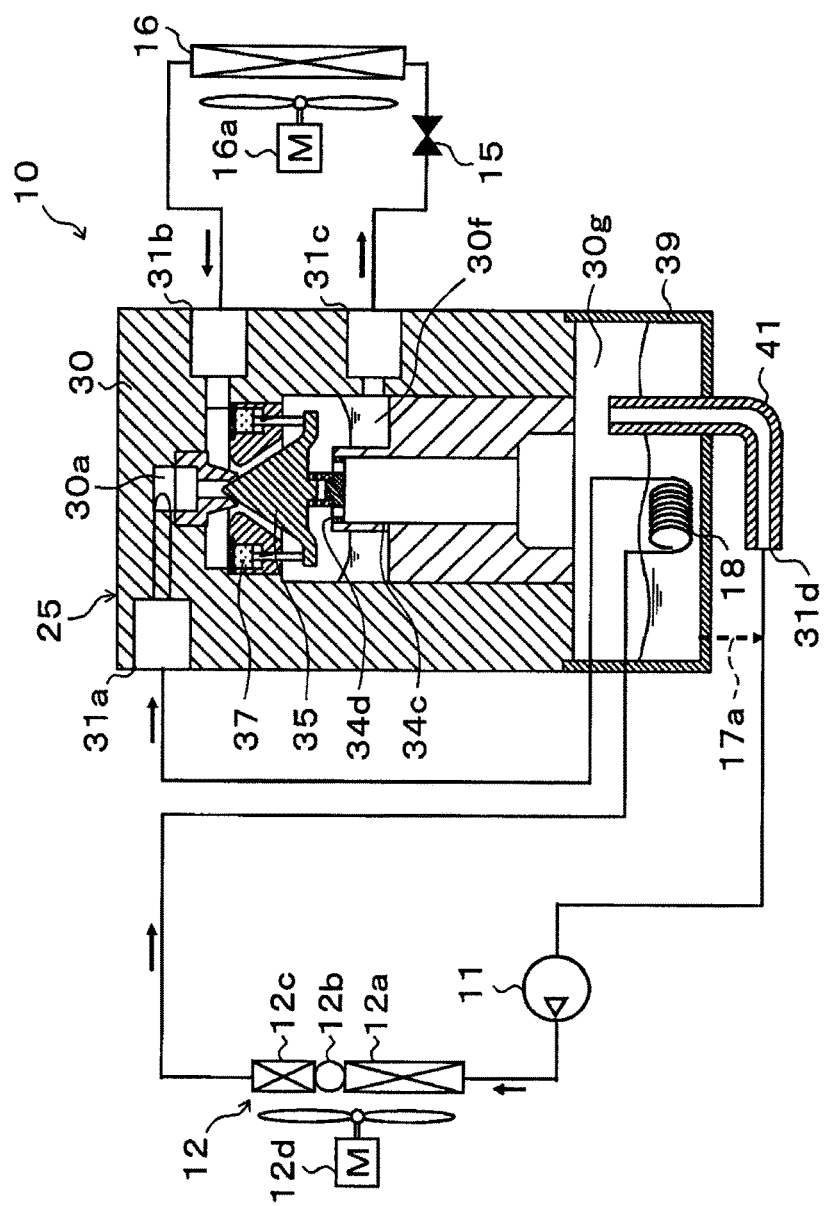
FIG. 9 is a schematic diagram of an ejector-type refrigeration cycle according to a sixth embodiment of the present disclosure.

In an ejector-type refrigeration cycle 10 according to the present embodiment, as illustrated in an overall configuration diagram of FIG. 9, an example in which the downstream side gas-liquid separator 17 is eliminated, and the configuration of the ejector 25 is changed in the third embodiment will be described.

In an ejector 25 of the present embodiment, a bottomed cylindrical cap-shaped member 39 is provided on a lower side, and a downstream side gas-liquid separation space 30g is defined in the interior of the cap-shaped member 39. The downstream side gas-liquid separation space 30g separates the refrigerant in which a gas-phase refrigerant and a liquid-phase refrigerant which flow out of a mixed-phase refrigerant outlet port 34d are mixed together into gas and liquid, and stores the separated liquid-phase refrigerant.

Further, a low-pressure refrigerant outlet port 31d according to the present embodiment is defined in a refrigerant flow downstream most portion of a gas-phase refrigerant outflow pipe 41 from which a gas-phase refrigerant separated by a downstream side gas-liquid separation space 30g flows out. A high-pressure refrigerant passage 18 similar to that in the first embodiment is disposed in the liquid-phase refrigerant stored in the downstream side gas-liquid separation space 30g, and an oil return passage 17a similar to that in the first embodiment is connected to a bottom surface of the cap-shaped member 39 of the ejector 25.

The rest of the configuration is the same as that in the first embodiment. Therefore, the same advantages as those in the first embodiment can be obtained when the ejector-type refrigeration cycle 10 according to the present embodiment is operated.

In other words, according to the ejector 25 of the present embodiment, as in the third embodiment, the concentration of the refrigerator oil in the liquid-phase refrigerant flowing out of the liquid-phase refrigerant outlet port 31c can be adjusted to an appropriate concentration, and a cooling capacity in the evaporator 16 can be brought closer to a maximum value. Further, as in the fifth embodiment, the ejector-type refrigeration cycle 10 can be reduced in size as a whole.

Other Embodiments

The present invention is not limited to the above-described embodiments, but various modifications can be made thereto as follows without departing from the spirit of the present disclosure. The devices and so on disclosed in each of the above embodiments may appropriately be combined within an implementable extent.

(1) In the first and second embodiments described above, the example in which the refrigerator oil concentration adjusting device is configured by the refrigerator oil bypass passages 23 and 23a each formed of a refrigerant piping having a diameter smaller than that of the other refrigerant pipings has been described. However, the refrigerator oil concentration adjusting device is not limited to the above configuration. For example, a refrigerator oil concentration adjusting device in which a refrigerant piping having the same diameter as that of the other refrigerant pipings is employed, and a flow rate adjustment valve is disposed in the refrigerant pipe may be provided.

In the embodiments described above, for example, the example in which the inner diameter of the refrigerator oil bypass passage 23 or the diameter of the small-diameter hole 22c defined in the body part 22 are set to appropriate values, and the concentration of the refrigerator oil in the liquid-phase refrigerant flowing into the evaporator 16 is adjusted has been described. However, the adjustment of the concentration of the refrigerator oil is not limited to the above.

For example, with a change in the number of refrigerator oil bypass passages 23 and the small-diameter holes 22c, the concentration of the refrigerator oil in the liquid-phase refrigerant flowing into the evaporator 16 may be adjusted. The same is applied to the refrigerator oil bypass passage 23a and the oil return hole 14c described in the second embodiment, the refrigerator oil bypass passage 34c described in the third embodiment, and the small-diameter hole 35a described in the fourth embodiment.

In the third embodiment, the example in which the refrigerator oil bypass passage 35b is disposed to introduce the refrigerator oil adhered to the outer peripheral wall surface of the passage formation member 35 forming the inner peripheral side of the diffuser passage 13c, or the refrigerant in which the refrigerator oil is dissolved with a high concentration to the downstream side of the mixed-phase refrigerant outlet port 34d has been described. It is needless to say that the refrigerator oil bypass passage 35b may be provided to introduce the refrigerator oil adhered to the inner peripheral wall surface of the body 30 forming the outer peripheral side of the diffuser passage 13c, or the refrigerant in which the refrigerator oil is dissolved with the high concentration to the downstream side of the mixed-phase refrigerant outlet port 34d.

(2) In the embodiment described above, the example in which the high-pressure refrigerant passage 18 is disposed in the liquid-phase refrigerant stored in the downstream side gas-liquid separator 17 or the downstream side gas-liquid separation space 30g as the internal heat exchange device has been described. However, the internal heat exchange device is not limited to the above configuration.

For example, since heat exchange has only to be performed between the refrigerant that has flowed out of the radiator 12 and the liquid-phase refrigerant stored in the downstream side gas-liquid separator 17 or the downstream side gas-liquid separation space 30g, the internal heat exchange device may be provided by joining the high-pressure refrigerant passage 18 to the outer peripheral side of the downstream side gas-liquid separator 17 or the outer peripheral side of the cup-shaped member 39 forming the downstream side gas-liquid separation space 30g.

(3) In the ejector 25 according to the fifth and sixth embodiments described above, as in the third embodiment, the refrigerator oil bypass passage 34c for introducing the refrigerator oil within the upstream side gas-liquid separation space 30f to the downstream side of the mixed-phase refrigerant outlet port 34d may be provided. Alternatively, as in the fourth embodiment, the refrigerator oil bypass passage 35b for introducing the refrigerator oil within the diffuser passage 13c to the downstream side of the mixed-phase refrigerant outlet port 34d may be provided.

Further, in the ejector 25 according to the third to sixth embodiments, the refrigerant oil bypass passage 34c, the small-diameter hole 35a, and the refrigerator oil bypass passage 35b may be employed, and both of the refrigerator oil within the upstream side gas-liquid separation space 30f and the refrigerator oil within the diffuser passage 13c may be introduced to the downstream side of the mixed-phase refrigerant outlet port 34d.

(4) In the above-described embodiments, examples in which a subcooling heat exchanger is employed as the radiator 12 have been described, but, it is needless to say that a normal radiator formed of only the condensing portion 12a may be employed as the radiator 12. Further, with a normal radiator, a receiver that separates the refrigerant radiated by the radiator into gas and liquid, and stores an excess liquid-phase refrigerant may be employed.

In the embodiments described above, the example in which the components such as the nozzle portion 21 and the body part 22 of the ejector 20 as well as the components such as the body 30 and the passage formation member 35 of the ejector 25 are made of metal has been described. The material is not limited if functions of the respective components can be exerted. Therefore, those components may be made of resin.

In the ejector 20 according to the first and second embodiments described above, no swirling space in which a swirling flow occurs in the refrigerant flowing into the nozzle portion 21 is provided, but as in the ejector 25 according to the third to sixth embodiments, a swirling space formation member forming the swirling space may be provided.

In the embodiments described above, a detailed configuration of the downstream side gas-liquid separator 17 is not described. However, as the downstream side gas-liquid separator 17, a gas-liquid separator of a centrifugal separation system, a gravity driven gas-liquid separator as well as a surface tension-type gas-liquid separator that performs gas-liquid separation by depositing a liquid-phase refrigerant to an attached plate which is bent in a wave may be employed.

The same is applied to a gas-liquid separation device formed by the downstream side gas-liquid separation space 30g. The upstream side gas-liquid separator 14 and the upstream side gas-liquid separation space 30f are not limited to the gas-liquid separation device of the centrifugal separation system.

In the above third to sixth embodiments, the description has been given of the example in which the driving device 37 that displaces the passage formation member 35 includes the sealed space 37b in which the temperature sensitive medium having the pressure changed according to a change in the temperature is enclosed, and the diaphragm 37a that is displaced according to the pressure of the temperature sensitive medium within the sealed space 37b. However, the driving device is not limited to this configuration.

For example, a thermowax having a volume changed according to the temperature may be employed as the temperature sensitive medium, or a configuration having an elastic member of a shape memory alloy may be used as the driving device. Further, a configuration in which the passage formation member 35 may be displaced by an electric mechanism such as an electric motor or a solenoid may be employed as the driving device.

(5) In the above embodiments, an example in which the ejector-type refrigeration cycle 10 of the present disclosure is applied to a vehicle air conditioning apparatus has been described, but the application of the ejector-type refrigeration cycle 10 having the ejector 25 of the present disclosure is not limited thereto. For example, the ejector-type refrigeration cycle 10 may be applied to, for example, a stationary air conditioning apparatus, a cold storage warehouse, a vending machine-cooling heating device, and so on.

In the above-described embodiments, the radiator 12 of the ejector-type refrigeration cycle 10 according to the present disclosure is used as an outdoor side heat exchanger that exchanges heat between the refrigerant and the outside air, and the evaporator 16 is used as a utilization side heat exchanger that cools the blast air. Conversely, a heat pump cycle in which the evaporator 16 is used as the outdoor side heat exchanger that absorbs heat from a heat source such as the outside air, and the radiator 12 is used as the indoor side heat exchanger that heats a heating-subject fluid such as air or water.

What is claimed is:

1. An ejector-type refrigeration cycle comprising: a compressor that compresses and discharges a refrigerant mixed with a refrigerator oil;
    a radiator that radiates a heat of the refrigerant discharged from the compressor;
    an ejector including a nozzle portion that depressurizes the refrigerant that has flowed out of the radiator, a refrigerant suction port through which the refrigerant from an evaporator is drawn due to a suction action of a high-speed ejection refrigerant which is the refrigerant ejected from the nozzle portion, and a pressure increase part that pressurizes a mixed refrigerant which is a mixture of the ejection refrigerant and the suction refrigerant drawn from the refrigerant suction port;
    an upstream side gas-liquid separator that separates the refrigerant that has flowed out of the ejector into the refrigerant in liquid phase and a residual refrigerant in gas-liquid two phase, the upstream side gas-liquid separator including a liquid-phase refrigerant outlet port from which the separated liquid-phase refrigerant flows out without being stored, and a mixed-phase refrigerant outlet port from which the residual gas-liquid two-phase refrigerant flows out;
    the evaporator evaporates the liquid-phase refrigerant that has flowed out of the liquid-phase refrigerant outlet port, and allows the refrigerant to flow out toward the refrigerant suction port;
    a downstream side gas-liquid separator that separates the gas-liquid two-phase refrigerant that has flowed out of the mixed-phase refrigerant outlet port into a gas-phase refrigerant and a liquid-phase refrigerant, stores the separated liquid-phase refrigerant, and allows the separated gas-phase refrigerant to flow out toward an inlet side of the compressor; and
    a refrigerator oil concentration adjusting device that adjusts a concentration of the refrigerator oil in the liquid-phase refrigerant that has flowed out of the liquid-phase refrigerant outlet port,
    wherein the refrigerator oil concentration adjusting device includes a refrigerator oil bypass passage that introduces the refrigerator oil within the pressure increase part to a downstream side of the mixed-phase refrigerant outlet port.

2. The ejector-type refrigeration cycle according to claim 1, further comprising a refrigerant passage that performs a heat exchange between the refrigerant that has flowed out of the radiator and the liquid-phase refrigerant stored in the downstream side gas-liquid separator.

3. The ejector-type refrigeration cycle according to claim 1, wherein
    the refrigerator oil concentration adjusting device adjusts the concentration of the refrigerator oil to set a cooling capacity of the evaporator for a fluid subjected to cooling at a desired capacity.

* * * * *